(12) United States Patent
Ueda et al.

(10) Patent No.: US 8,264,630 B2
(45) Date of Patent: Sep. 11, 2012

(54) ACTIVE MATRIX SUBSTRATE AND LIQUID CRYSTAL DISPLAY DEVICE

(75) Inventors: Nobuyoshi Ueda, Osaka (JP); Hiroyuki Iida, Osaka (JP); Takaharu Yamada, Osaka (JP); Ryoki Ito, Osaka (JP); Satoshi Horiuchi, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 266 days.

(21) Appl. No.: 12/810,792

(22) PCT Filed: Feb. 4, 2009

(86) PCT No.: PCT/JP2009/000430
§ 371 (c)(1),
(2), (4) Date: Jun. 25, 2010

(87) PCT Pub. No.: WO2009/125532
PCT Pub. Date: Oct. 15, 2009

(65) Prior Publication Data
US 2010/0277661 A1    Nov. 4, 2010

(30) Foreign Application Priority Data

Apr. 11, 2008  (JP) ................ 2008-103531

(51) Int. Cl.
*G02F 1/136* (2006.01)

(52) U.S. Cl. .......................................... 349/43
(58) Field of Classification Search .............. None
See application file for complete search history.

(56) References Cited

U.S. PATENT DOCUMENTS

| | | |
|---|---|---|
| 6,411,346 B1 | 6/2002 | Numano et al. |
| 2002/0113916 A1 | 8/2002 | Hashiguchi et al. |
| 2003/0006978 A1 | 1/2003 | Fujiyoshi |
| 2003/0016310 A1 | 1/2003 | Lee |
| 2005/0088599 A1 | 4/2005 | Hashiguchi et al. |
| 2005/0139922 A1 | 6/2005 | Kim et al. |
| 2008/0078999 A1 | 4/2008 | Lai |

FOREIGN PATENT DOCUMENTS

| | | |
|---|---|---|
| JP | 6-235938 A | 8/1994 |
| JP | 9-304790 A | 11/1997 |
| JP | 2000-2889 A | 1/2000 |
| JP | 2003-75871 A | 3/2003 |
| JP | 2006-154080 | 6/2006 |
| JP | 3881160 B2 | 11/2006 |
| RU | 2069417 C1 | 11/1996 |

OTHER PUBLICATIONS

Full English machine translation of JP-20000-002889, which was previously cited in Information Disclosure Statement filed on Jun. 25, 2010.
Full English machine translation of JP-2003-075871, which was previously cited in Information Disclosure Statement filed on Jun. 25, 2010.
Full English machine translation of JP-2003-22057, which was previously cited in Information Disclosure Statement filed on Jun. 25, 2010.
Full English machine translation of JP-2005-128190, which was previously cited in Information Disclosure Statement filed on Jun. 25, 2010.

*Primary Examiner* — Sung Pak
(74) *Attorney, Agent, or Firm* — Birch, Stewart, Kolasch & Birch, LLP

(57) ABSTRACT

In an auxiliary capacitance electrode of each pixel region, a side end on one side in a direction in which a drain electrode crosses an end of a gate electrode so as to enter from the outside of the gate electrode to the inside thereof is disposed inside of an auxiliary capacitance line, and a side end on the other side in a direction in which the drain electrode crosses the end of the gate electrode so as to go out from the inside of the gate electrode to the outside thereof is disposed outside of the auxiliary capacitance line.

9 Claims, 19 Drawing Sheets

ACTIVE MATRIX SUBSTRATE AND LIQUID CRYSTAL DISPLAY DEVICE

TECHNICAL FIELD

The present invention relates to an active matrix substrate and a liquid crystal display device.

BACKGROUND ART

Liquid crystal displays have characteristics that they are thin and that they require low power consumption. Making use of these characteristics leads to wide use of liquid crystal display devices, liquid crystal displays have conventionally been used in a wide range as displays of the whole devices which are not limited to common devices, such as television sets and personal computers, but include measurement hardware, medical equipment and industrial equipment. As the liquid crystal display device, an active matrix drive liquid crystal display device is known in which a TFT (thin film transistor) is provided for each pixel, that is the minimum unit for displaying an image, so as to allow a fine image to be displayed.

The active matrix drive liquid crystal display device comprises an active matrix substrate on which a plurality of TFTs mentioned above are provided, a counter substrate which is disposed to face the active matrix substrate and on which a common electrode and the like are formed, and a liquid crystal layer provided between the active matrix substrate and the counter substrate.

FIG. 17 is a plan view schematically showing part of a conventional active matrix substrate.

In the active matrix substrate, as shown in FIG. 17, a plurality of source lines 100 extending in parallel to one another and a plurality of gate lines 101 extending in parallel to one another are provided to intersect. On the active matrix substrate, each TFT 102 is provided near the corresponding intersection of the source line 100 and the gate line 101, and a plurality of pixel electrodes 104 (shown in a transmission form) which are electrically connected to the corresponding TFT 102 through contact holes 103 formed in an insulating film (not shown) covering the TFTs 102 is formed in a matrix form.

Further, on the active matrix substrate, a plurality of auxiliary capacitance lines 105 are provided to each extend between the gate lines 101. Provided on each auxiliary capacitance line 105 are a plurality of auxiliary capacitance electrodes 107 formed to be integrated with drain electrodes 106 of the corresponding TFTs 102, and auxiliary capacitances for holding potentials written in the corresponding pixel electrodes 104 are formed between the auxiliary capacitance line 105 and the auxiliary capacitance electrodes 107 which overlap each other.

FIG. 18 shows a relationship among signal patterns which are applied to a gate line, a source line and a pixel electrode, respectively. As shown in FIG. 18, when a potential Vgh is applied to a gate line, a TFT connected to the gate line is turned on, and a potential $V_s$ which has been applied to a source line connected to the TFT is applied via a drain electrode to a pixel electrode. At this point, writing is performed until a potential $V_{P0}$ of the pixel electrode reaches the same as the potential $V_s$ of the source line. When a potential Vgl is applied to the gate line, the potential of the pixel electrode drops, which results in a difference ΔVgd from the potential $V_{P0}$ upon completion of the writing. The difference ΔVgd resulting from the drop of the potential of the pixel electrode is generated by a parasitic capacitance between a drain electrode and a gate electrode in each pixel, and is called a feedthrough voltage. In cases where the feedthrough voltage ΔVgd varies from one pixel to another, display defects, such as brightness unevenness and flicker, are likely to be visually recognized.

The feedthrough voltage ΔVgd is simply expressed by the following equation. Note that Vgpp represents a difference between Vgh and Vgl (Vgh-Vgl), Cgd represents a parasitic capacitance between a gate electrode and a drain electrode, Cs represents an auxiliary capacitance, and Clc represents a liquid crystal capacitance.

$$\Delta Vgd = Vgpp \times Cgd/(Clc+Cs+Cgd)$$

In recent years, as upsizing of display screens of television sets and the like have been demanded, the sizes of active matrix substrates have become larger. To manufacture an active matrix substrate, pattern formation is usually performed using photolithography to form lines and electrodes. In photolithography at the time of manufacturing a large-sized active matrix substrate, performed as an exposure process in which a resist applied onto a glass substrate is exposed through a photomask is an exposure process of a step-division exposure method. In the exposure process of this method, a photomask smaller than a glass substrate is disposed on the glass substrate, and exposure is performed in a divided manner using a plurality of shots while the glass substrate is moved stepwise and the photomask is replaced as necessary.

In the exposure process of the step-division exposure method, a resist on a glass substrate is exposed in a divided manner using a plurality of shots, and therefore exposure with relatively high alignment accuracy is required among a plurality of blocks defined for the corresponding areas on the glass substrate which are exposed in the shots. If an alignment error of an exposure device occurs in each block, arrangement relationships among lines, electrodes and a semiconductor layer and the like differ from one block to another, and therefore the parasitic capacitance Cgd, which is determined by the overlapping area of the gate electrode and the drain electrode, differs from one block to another. As a result, there is a difference in feedthrough voltage from one block to another, which makes it easy for brightness irregularities among blocks to be visually recognized on a display screen.

In a liquid crystal display device disclosed in PATENT DOCUMENT 1, widths of portions of a semiconductor layer in a TFT and a drain electrode overlapping the semiconductor layer which cross an end of a gate electrode are made smaller than the width of the drain electrode which is a channel width of the TFT. This can decrease the difference among blocks in the overlapping area between the gate electrode and the drain electrode which is caused by an alignment error in a direction perpendicular to the channel width.

CITATION LIST

Patent Document

PATENT DOCUMENT 1: Japanese Patent No. 3881160

SUMMARY OF THE INVENTION

Technical Problem

However, even with a liquid crystal display device of PATENT DOCUMENT 1, an alignment error of an exposure device occurs among blocks in the exposure process at the time of forming the drain electrode, both the arrangement relationship between the auxiliary capacitance electrode formed to be integrated with the drain electrode and the auxiliary capacitance line and the arrangement relationship between the gate electrode and the drain electrode differ from one block to another, and therefore the auxiliary capacitance Cs, which is determined by the overlapping area of the auxiliary capacitance electrode and the auxiliary capacitance line, varies from one block to another. As a result, both variations of the parasitic capacitance Cgd and variations of the auxiliary capacitance Cs occur among blocks. There is therefore a possibility that these two factors together prevent differences in the feedthrough voltage ΔVgd among blocks from being fully suppressed, which results in brightness irregularities being visually recognized on a display screen as described above. Thus, this liquid crystal display device has room for improvement.

The present invention has been made in view of such issues, and an object of the invention is to suppress variations of a feedthrough voltage generated by a parasitic capacitance between a gate electrode and a drain electrode.

Solution to the Problem

To achieve the above object, according to this invention, in each of auxiliary capacitance electrodes in the corresponding pixel regions, a side end on one side in a direction in which the drain electrode crosses an end of the gate electrode so as to enter from the outside of the gate electrode to the inside thereof is disposed inside of the auxiliary capacitance line, and a side end on the other side in a direction in which the drain electrode crosses the end of the gate electrode so as to go out from the inside of the gate electrode to the outside thereof is disposed outside of the auxiliary capacitance line.

Specifically, an active matrix substrate of the invention comprising a plurality of pixel regions defined in a matrix form, a plurality of source lines provided to extend in parallel to one another between the pixel regions, a plurality of gate lines provided to extend in parallel to one another in directions intersecting the source lines, a plurality of auxiliary capacitance lines provided to each extend between the gate lines, a plurality of thin film transistors each having a gate electrode electrically connected to one of the gate lines, a semiconductor layer provided to overlap the gate electrode, a source electrode provided to overlap the gate electrode and the semiconductor layer, the source electrode being electrically connected to one of the source lines, and a drain electrode provided to cross an end of the gate electrode so as to overlap the gate electrode and the semiconductor layer, and a plurality of auxiliary capacitance electrodes provided in the corresponding pixel regions so as to extend along the auxiliary capacitance lines and to overlap the auxiliary capacitance lines, in the same layer as the drain electrode of each of the thin film transistors, wherein, in each of the auxiliary capacitance electrodes of the pixel regions, a side end on one side is disposed inside of one of the auxiliary capacitance lines, the side end on one side being in a direction in which the drain electrode crosses the end of the gate electrode so as to enter from outside of the gate electrode to inside thereof, and a side end on another side is disposed outside of the one of the auxiliary capacitance lines, the side end on another side being in a direction in which the drain electrode crosses the end of the gate electrode so as to go out from the inside of the gate electrode to the outside thereof.

With this configuration, in the auxiliary capacitance electrode in each pixel region, a side end on one side in a direction in which the drain electrode crosses an end of the gate electrode so as to enter from the outside of the gate electrode to the inside thereof is disposed inside of the auxiliary capacitance line, and a side end on the other side in a direction in which the drain electrode crosses the end of the gate electrode so as to go out from the inside of the gate electrode to the outside thereof is disposed outside of the auxiliary capacitance line. This causes the overlapping area of the auxiliary capacitance electrode formed in the same layer as the drain electrode and the auxiliary capacitance line to vary in accordance with and together with the variation of the overlapping area of the gate electrode and the drain electrode. That is, in cases where the drain electrode deviates toward a side of the direction in which the drain electrode crosses the end of the gate electrode so as to enter from the outside of the gate electrode to the inside thereof, which results in an increase in the overlapping area of the drain electrode and the gate electrode, the auxiliary capacitance electrode also deviates toward the side of the same direction as the drain electrode, which causes the overlapping area of the auxiliary capacitance electrode and the auxiliary capacitance line to be increased by the amount corresponding to the deviation of the drain electrode. Alternatively, in cases where the drain electrode deviates toward a side of the direction in which the drain electrode crosses the end of the gate electrode so as to go out from the inside of the gate electrode to the outside thereof, which results in a decrease in the overlapping area of the drain electrode and the gate electrode, the auxiliary capacitance electrode also deviates toward the side of the same direction as the drain electrode, which causes the overlapping area of the auxiliary capacitance electrode and the auxiliary capacitance line to be decreased by the amount corresponding to the deviation of the drain electrode. Accordingly, since an auxiliary capacitance between the auxiliary capacitance electrode and the auxiliary capacitance line can be increased and decreased in accordance with an increase and a decrease of a parasitic capacitance between the gate electrode and the drain electrode, effects of the parasitic capacitance and the auxiliary capacitance on a feedthrough voltage cancel each other. As a result, variations of the feedthrough voltage, which is generated by a parasitic capacitance between the gate electrode and the drain electrode, are suppressed.

It is preferable that each of the auxiliary capacitance lines have a capacitance main line provided to extend along one of the gate lines, and a capacitance branch line provided to project to a side from the capacitance main line, and that each of the auxiliary capacitance electrodes be provided to overlap the capacitance main line and the capacitance branch line.

With this configuration, since each of the auxiliary capacitance electrodes is provided to overlap both the capacitance main line and the capacitance branch line, the overlapping area of the auxiliary capacitance electrode and the auxiliary capacitance line increases, which results in an increase in auxiliary capacitance to decrease the feedthrough voltage. In addition to this matter, by lengthening, in the auxiliary capacitance electrode, a portion which crosses the side end of the auxiliary capacitance line, it becomes possible to increase the auxiliary capacitance in accordance with an increase and a decrease in parasitic capacitance between the gate electrode and the drain electrode. This enables an increase and a decrease of the auxiliary capacitance with respect to an increase and a decrease in parasitic capacitance between the gate electrode and the drain electrode to be appropriately adjusted, so that variations of the feedthrough voltage are suppressed as much as possible.

It is preferable that the plurality of pixel regions be included in a plurality of pixel region groups arranged along the source lines, and that, in each of the pixel region groups, the source electrodes be connected to the same one of the source lines, and the gate electrodes are connected to the gate lines which differ from one another.

With this configuration, in each pixel region group, the source electrodes are connected to the same source line, and the gate electrodes are connected to the gate lines which differ from one another. Therefore, the number of source lines connected to the source electrodes of each pixel region group can be made smaller than that in cases where, in each pixel region group, the source electrodes are connected to the source lines which differ from one another, and the gate electrodes are connected to the same gate line. This enables the number of source driver IC chips, which are more expensive than gate driver IC chips, to be decreased, and therefore cost can be reduced.

A liquid crystal display device according to the invention comprises the active matrix substrate, a counter substrate disposed to face the active matrix substrate, and a liquid crystal layer provided between the active matrix substrate and the counter substrate.

With this configuration, inclusion of the active matrix substrate causes an auxiliary capacitance between the auxiliary capacitance electrode and the auxiliary capacitance line to be increased and decreased in accordance with an increase and a decrease of a parasitic capacitance between the gate electrode and the drain electrode. As a result, variations of a feedthrough voltage generated by the parasitic capacitance between the gate electrode and the drain electrodes are suppressed. This makes it difficult for brightness irregularities to be visually recognized on a display screen.

It is preferable that a vertical alignment layer and a plurality of alignment regulating portions for dividing the liquid crystal layer into a plurality of domains for each of the pixel regions be provided on each of sides of the liquid crystal layer of the active matrix substrate and the counter substrate, and that at least part of the plurality of alignment regulating portions be formed to overlap at least one of the auxiliary capacitance lines and the auxiliary capacitance electrodes.

With this configuration, the vertical alignment layer and the plurality of alignment regulating portions for dividing the liquid crystal layer into a plurality of domains for each pixel region are provided on each of the sides of the liquid crystal layer of the active matrix substrate and the counter substrate, and therefore, when a voltage is not applied to the liquid crystal layer, just liquid crystal molecules near the alignment regulating portions are aligned in a tilted manner centered at the alignment regulating portions, and all other liquid crystal molecules apart from the alignment regulating portions are aligned perpendicular to the surface of the active matrix substrate (counter substrate). When a voltage is applied to the liquid crystal layer, liquid crystal molecules apart from the alignment regulating portions are aligned in accordance with the tilted alignment of the liquid crystal molecules near the alignment regulating portions. This suppresses the amount of transmitted light which varies with the angle of visual recognition, thereby improving visual angle characteristics during displaying an image. This improvement increases the viewing angle.

In areas where the alignment regulating portions are provided, the alignment of liquid crystal molecules is likely to be out of order, and therefore light transmittance is likely to decrease and light leakage is likely to occur. In areas where the auxiliary capacitance line and the auxiliary capacitance electrode are provided, the auxiliary capacitance line and the auxiliary capacitance electrode block light transmission to decrease the light transmittance. With the above configuration, at least part of the plurality of alignment regulating portions is formed to overlap at least one of the auxiliary capacitance line and the auxiliary capacitance electrode. Therefore, compared to cases where at least part of the plurality of alignment regulating portions is formed in another area, that is the plurality of alignment regulating portions is formed so as not to overlap either the auxiliary capacitance lines or the auxiliary capacitance electrodes, the decrease in light transmittance is suppressed, and light leakage is suppressed from the areas where liquid crystal molecules are likely to be out of alignment, which results in an increase in contrast.

It is preferable that each of the auxiliary capacitance lines have a capacitance main line provided to extend along one of the gate lines, and a capacitance branch line provided to project to a side from the capacitance main line, and that each of the auxiliary capacitance electrodes be provided to overlap the capacitance main line and the capacitance branch line.

With this configuration, each auxiliary capacitance electrode is provided to overlap both the capacitance main line and the capacitance branch line, and therefore the overlapping area of the auxiliary capacitance electrode and the auxiliary capacitance line increases, which results in an increase in auxiliary capacitance to decrease the feedthrough voltage. In addition to this matter, by lengthening, in the auxiliary capacitance electrode, a portion which crosses a side end of the auxiliary capacitance line, it becomes possible to increase the auxiliary capacitance which increases and decreases in accordance with an increase and a decrease in parasitic capacitance between the gate electrode and the drain electrode. This enables an increase and a decrease of the auxiliary capacitance with respect to an increase and a decrease in parasitic capacitance between the gate electrode and the drain electrode to be appropriately adjusted, so that variations of the feedthrough voltage are suppressed as much as possible.

It is preferable that each of the auxiliary capacitance electrodes be provided to extend along the capacitance main line and the capacitance branch line such that, in a plurality of portions among portions along the capacitance main line and the capacitance branch line, the side end on one side is disposed inside of the auxiliary capacitance line, and the side end on another side is disposed outside of the auxiliary capacitance line.

With this configuration, in a plurality of portions among portions along the capacitance main line and the capacitance branch lines in each auxiliary capacitance electrode, side ends on the one side are disposed inside of the auxiliary capacitance line, and side ends on the other side are disposed outside of the auxiliary capacitance line. This increases the auxiliary capacitance, which increases and decreases in accordance with an increase and a decrease in parasitic capacitance between the gate electrode and the drain electrode, more than the case in which, in just one portion among portions along the capacitance main line and the capacitance branch lines of the auxiliary capacitance electrode, a side end on the one side is disposed inside of the auxiliary capacitance line, and a side end on the other side is disposed outside of the auxiliary capacitance line.

A pixel electrode electrically connected to the drain electrode may be provided in each of the pixel regions, each of the alignment regulating portions of the active matrix substrate may be made of a slit formed in the pixel electrode, and each of the alignment regulating portions of the counter substrate may be made of a projection formed to project on the side of the liquid crystal layer.

With this configuration, when a voltage is not applied to the liquid crystal layer, just liquid crystal molecules near the slits and the projections are aligned in a tilted manner centered at the slits and the projections, and all other liquid crystal molecules apart from the slits and the projections are aligned perpendicular to the surface of the active matrix substrate (counter substrate). When a voltage is applied to the liquid crystal layer, liquid crystal molecules apart from the slits and the projections are aligned in accordance with the tilted alignment of the liquid crystal molecules near the slits and the projections. This suppresses the amount of transmitted light which varies with the angle of visual recognition, thereby improving visual angle characteristics during displaying an image. This improvement increases the viewing angle.

A pixel electrode electrically connected to the drain electrode may be provided in each of the pixel regions, a common electrode may be provided to overlap the pixel electrode, on the side of the liquid crystal layer of the counter substrate, each of the alignment regulating portions of the active matrix substrate may be made of a slit formed in the pixel electrode, and each of the alignment regulating portions of the counter substrate may be made of a slit formed in the common electrode.

With this configuration, when a voltage is not applied to the liquid crystal layer, just liquid crystal molecules near the slits of the pixel electrodes and the common electrode are aligned in a tilted manner centered at the slits, and all other liquid crystal molecules apart from the slits are aligned perpendicular to the surface of the active matrix substrate (the counter substrate). When a voltage is applied to the liquid crystal layer, liquid crystal molecules apart from the slits are aligned in accordance with the tilted alignment of the liquid crystal molecules near the slits. This suppresses the amount of transmitted light which varies with the angle of visual recognition, thereby improving visual angle characteristics during displaying an image. This improvement increases the viewing angle.

Advantages of the Invention

According to the invention, in the auxiliary capacitance electrode in each pixel region, a side end on one side in a direction in which the drain electrode crosses an end of the gate electrode so as to enter from the outside of the gate electrode to the inside thereof is disposed inside of the auxiliary capacitance line, and a side end on the other side in a direction in which the drain electrode crosses the end of the gate electrode so as to go out from the inside of the gate electrode to the outside thereof is disposed outside of the auxiliary capacitance line, and therefore variations of the feedthrough voltage, which is generated by a parasitic capacitance between the gate electrode and the drain electrode, are suppressed.

DESCRIPTION OF EMBODIMENTS

Embodiments of the invention will be described in detail below with reference to the drawings. Note that the invention is not limited to the following embodiments.

First Embodiment of the Invention

Figure 1:
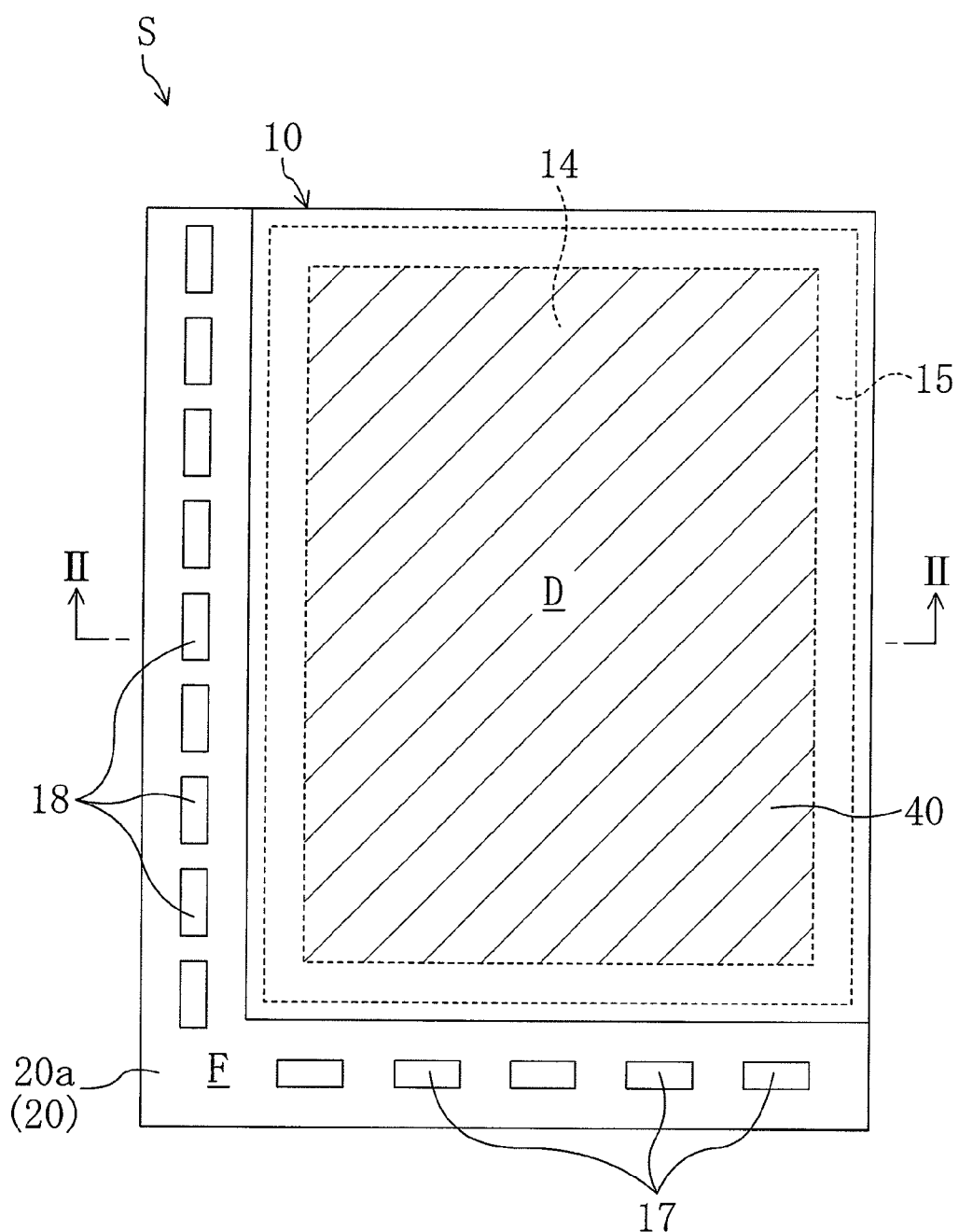
FIG. 1 is a plan view schematically showing a liquid crystal display device.
Figure 2:
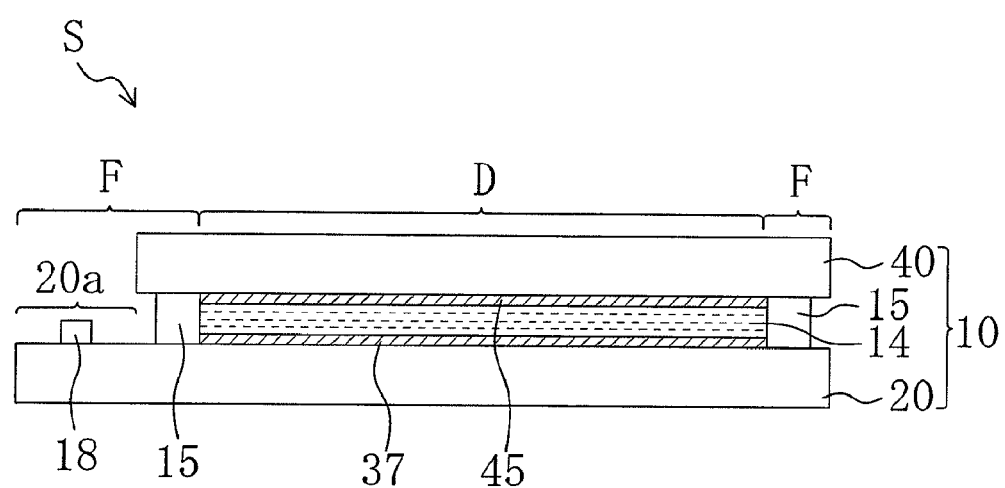
FIG. 2 is a schematic cross-sectional view taken along the line II-II of FIG. 1.
Figure 3:
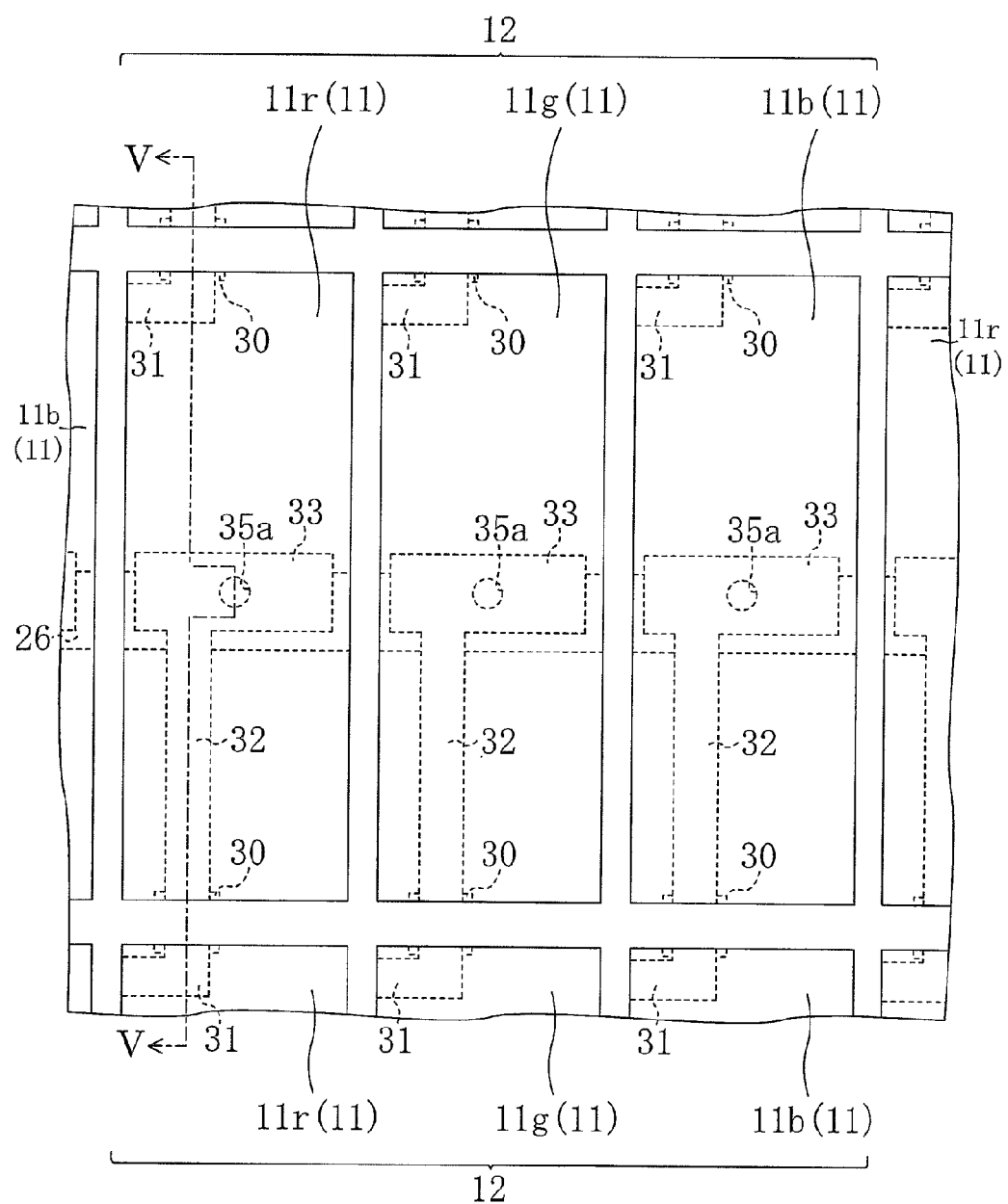
FIG. 3 is a plan view schematically showing, on an enlarged scale, part of a liquid crystal display device in a first embodiment.
Figure 4:
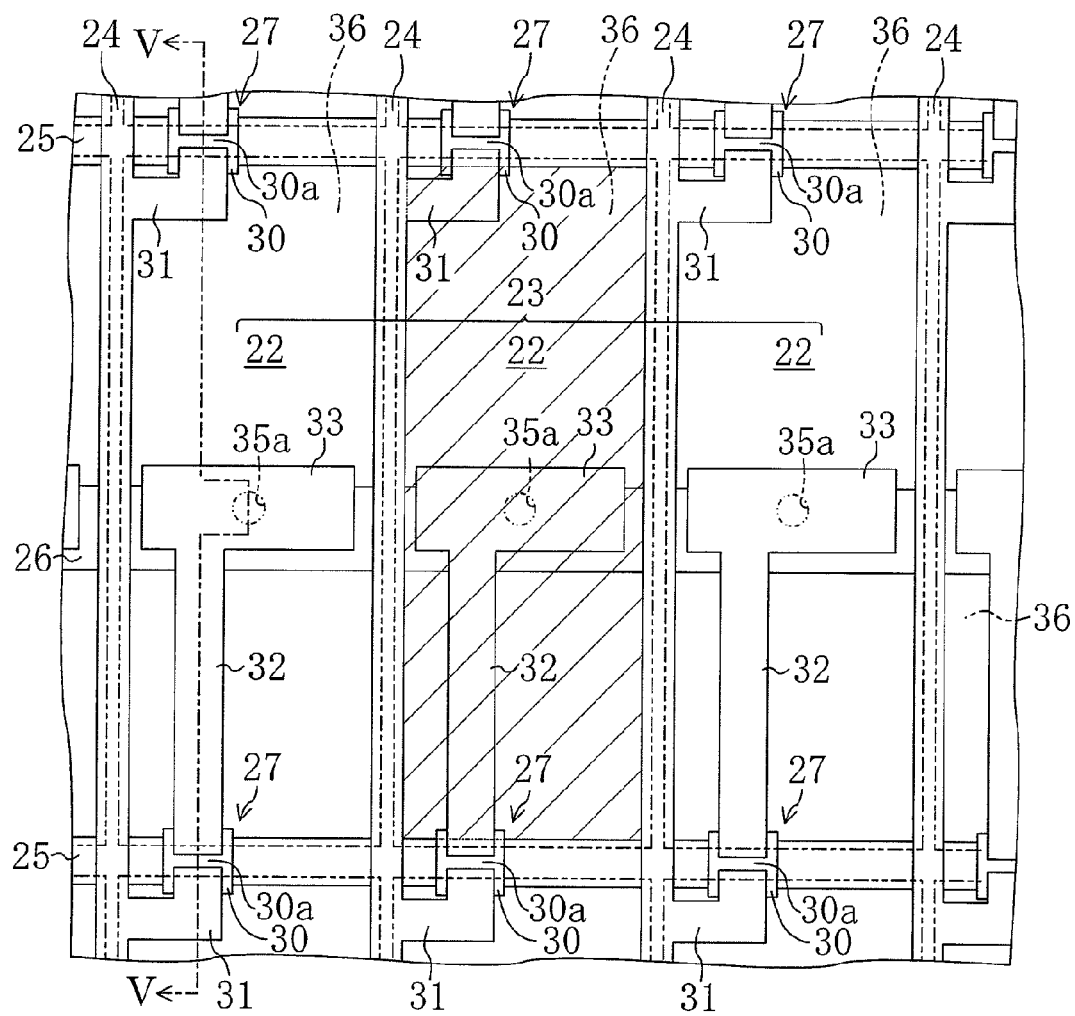
FIG. 4 is a plan view schematically showing, on an enlarged scale, part of an active matrix substrate in the first embodiment.
Figure 5:
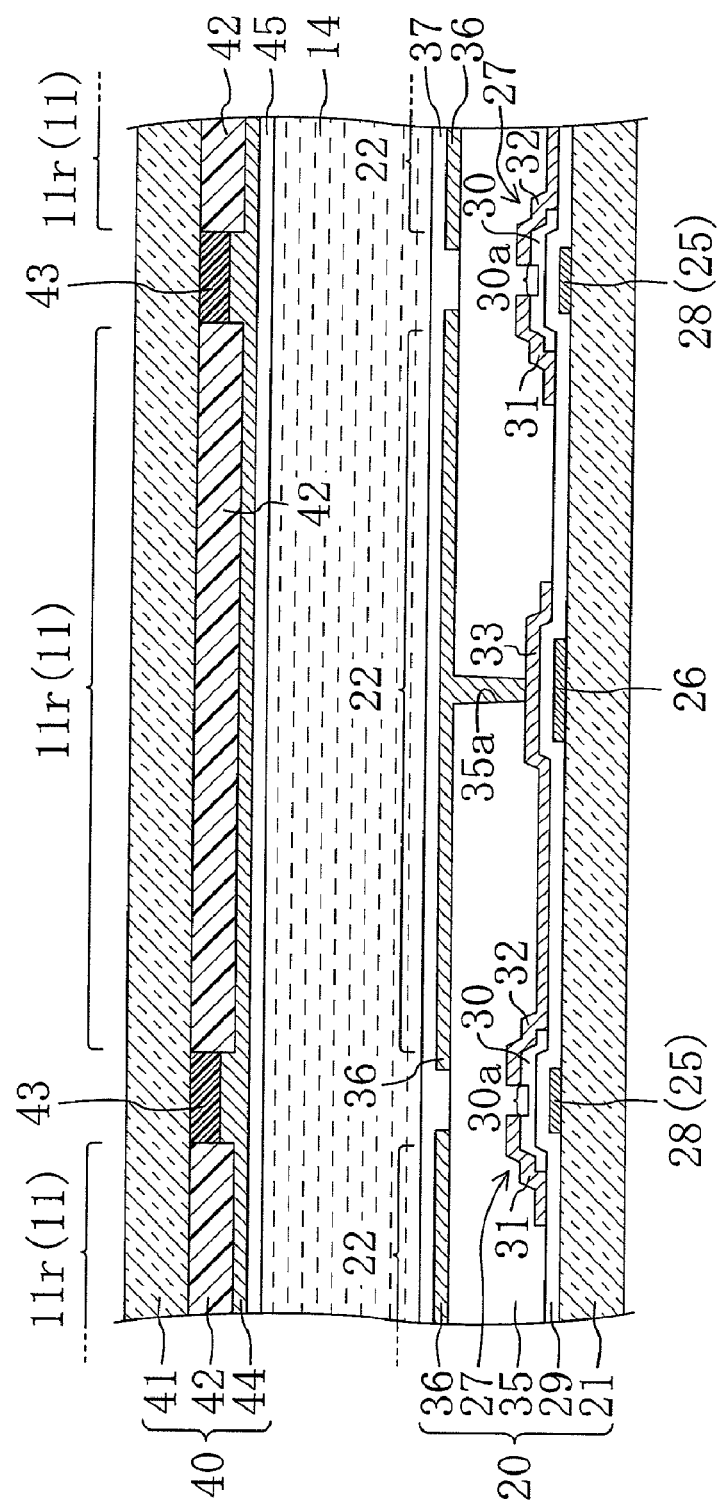
FIG. 5 is a schematic cross-sectional view taken along the line V-V of FIG. 3.

FIGS. 1 to 8 show a first embodiment of the invention. FIG. 1 is a plan view schematically showing a liquid crystal display device S. FIG. 2 is a cross-sectional view schematically showing the liquid crystal display device S, taken along the line II-II of FIG. 1. FIG. 3 is a plan view schematically showing, on an enlarged scale, part of the liquid crystal display device S. FIG. 4 is a plan view schematically showing, on an enlarged scale, part of one substrate 20 included in the liquid crystal display device S. FIG. 5 is a cross-sectional view schematically showing the liquid crystal display device S, taken along the line V-V of FIG. 3. Note that, in FIG. 4, a laminated insulating film 35 and pixel electrodes 36 are shown transparent.

The liquid crystal display device S, as shown in FIG. 1 and FIG. 2, includes a liquid crystal display panel 10 in which a pair of substrates 20 and 40 are bonded together. The liquid crystal display panel 10 includes the active matrix substrate 20, the counter substrate 40 disposed to face the active matrix substrate 20, and a liquid crystal layer 14 provided between the active matrix substrate 20 and the counter substrate 40.

The liquid crystal display panel 10 has a display portion D in which an image is displayed, and a frame portion F which is a non-display portion disposed outside of the display portion D.

The active matrix substrate 20 and the counter substrate 40 are formed, for example, in rectangular forms. As shown in FIG. 2, alignment layers 37 and 45 are provided on the surfaces on the sides of the liquid crystal layer 14 of the active matrix substrate 20 and the counter substrate 40, respectively, and polarizing plates (not shown) are provided on the surfaces on the sides remote from the liquid crystal layer 14 of the active matrix substrate 20 and the counter substrate 40, respectively. A sealing material 15 in a frame form made of an epoxy resin is disposed between the active matrix substrate 20 and the counter substrate 40, and a liquid crystal material is enclosed inside of the sealing material 15, so that the liquid crystal layer 14 is provided.

The display portion D, as shown in FIG. 3, includes a plurality of pixels 11 provided in a matrix form. Regarding the plurality of pixels 11, each plurality of pixels 11 arranged in the row direction (the lateral direction in FIG. 3) are included in a pixel group 12. As used herein, the minimum unit of image display is referred to as a "pixel," and one "pixel group" includes "pixels" of a plurality of colors. Specifically, each pixel group 12 in the present embodiment includes red, green and blue pixels 11r, 11g and 11b arranged in the form of stripes in the row direction. Each pixel 11 is provided such that the length in the column direction (the longitudinal direction in FIG. 3) is approximately three times the length in the row direction. Note that, in the present embodiment, the counter substrate 40 is provided with a black matrix 43 to be described later, and therefore regions in which openings of the black matrix 43 are formed correspond to the pixels 11.

On the active matrix substrate 20, as shown in FIG. 4, a plurality of pixel regions 22 included in the corresponding pixels 11 are defined in a matrix form. That is, each pixel 11 is configured such that the corresponding pixel region 22 and the counter substrate 40 face each other with the liquid crystal layer 14 interposed therebetween. The plurality of pixel regions 22 are included in a plurality of pixel region groups 23 such that a plurality of pixel regions 22 arranged in the row direction so as to correspond to one pixel group 12 are included in each pixel region group 23.

The active matrix substrate 20 has a glass substrate 21 shown in FIG. 5, and includes, in the display portion D on the glass substrate 21, as shown in FIG. 4, a plurality of source lines 24 provided to extend in parallel to one another between the pixel regions 22, a plurality of gate lines 25 provided to extend in parallel to one another in the directions intersecting the source lines 24 between the pixel regions 22, a plurality of thin film transistors (hereinafter referred to as "TFT") 27 electrically connected to the corresponding source lines 24 and gate lines 25, and a plurality of pixel electrodes 36 electrically connected to the corresponding TFT 27.

Each source line 24 is linearly provided to extend in the column direction, and each gate line 25 is linearly provided to extend in the row direction. Each auxiliary capacitance line 26 is linearly provided between the gate lines 25 to extend along the gate lines 25.

Each TFT 27 is provided near an intersection of the source line 24 and the gate line 25 for the corresponding pixel region 22. The TFTs 27 in each pixel region group 23 are connected to the source lines 24 which differ from one another, and are connected to the same gate line 25. Each TFT 27, as shown in FIG. 5, is a bottom gate TFT, and includes a gate electrode 28 electrically connected to the gate line 25, a semiconductor layer 30 provided to overlap the gate electrode 28, a source electrode 31 connected to the semiconductor layer 30 on one side of the gate electrode 28, and a drain electrode 32 connected to the semiconductor layer 30 on the other side of the gate electrode 28.

The gate lines 25, as shown in the drawing, are formed together with the auxiliary capacitance lines 26 on the surface of the glass substrate 21 and are covered with the gate insulating film 29. The semiconductor layer 30 of each TFT 27 is formed to cross part of the gate line 25 with the gate insulating film 29 interposed therebetween. Part of the gate line 25 overlapping the semiconductor layer 30 forms the gate electrode 28 of the TFT 27.

Each semiconductor layer 30, which is not shown, includes, for example, an intrinsic amorphous silicon layer and n+ amorphous silicon layer laminated in sequence. The n+ amorphous silicon layer, from which an area overlapping the gate electrode 28 is partially removed, is divided into two, and an area of the intrinsic amorphous silicon layer exposed from the n+ amorphous silicon layer forms a channel 30a.

Each source electrode 31 is formed to cross one end of the gate electrode 28 in the width direction of the gate line 25 to overlap the gate electrode 28 and the semiconductor layer 30, and is connected to the corresponding source line 24 as shown in FIG. 4. Each drain electrode 32 is formed apart from the source electrode 31 with the channel 30a sandwiched therebetween such that the drain electrode 32 crosses the other end of the gate electrode 28 so as to overlap the gate electrode 28 and the semiconductor layer 30.

In the same layer as the drain electrode 32, an auxiliary capacitance electrode 33 is provided in each pixel region 22 to extend along the auxiliary capacitance line 26 and to overlap the auxiliary capacitance line 26 such that, in each pixel region 22, an auxiliary capacitance for holding a potential written in the pixel electrode 36 is formed between the auxiliary capacitance line 26 and the auxiliary capacitance electrode 33. Each auxiliary capacitance electrode 33 is formed integrally with the drain electrode 32 of the TFT 27 in the pixel region 22 in which the auxiliary capacitance electrode 33 is provided.

In each pixel region 22, the auxiliary capacitance electrode 33 is configured, as shown in FIG. 4, such that a side end on one side (lower side in the drawing) in a direction in which the drain electrode 32 crosses an end of the gate electrode 28 so as to enter from the outside of the gate electrode 28 to the inside thereof is disposed inside of the auxiliary capacitance line 26, and such that a side end on the other side (upper side in the drawing) in a direction in which the drain electrode 32 crosses the end of the gate electrode 28 so as to go out from the inside of the gate electrode 28 to the outside thereof is disposed outside of the auxiliary capacitance line 26. The auxiliary capacitance electrode 33 in each pixel region 22 is disposed so as to increase and decrease an auxiliary capacitance between the auxiliary capacitance line 26 and the auxiliary capacitance electrode 33 in accordance with an increase and a decrease of a parasitic capacitance between the gate electrode 28 and the drain electrode 32 caused by a deviation in the column direction (the longitudinal direction in FIG. 4) of the position at which the integrally formed drain electrode 32 is formed.

Here, from the viewpoint of making constant a feedback voltage generated by a parasitic capacitance between the drain electrode 32 and the gate electrode 28, regardless of the magnitude of the parasitic capacitance, in each pixel region 22, it is preferable that the drain electrode 32 and the auxiliary capacitance electrode 33 be formed such that an increase and a decrease of the sum of an auxiliary capacitance between the auxiliary capacitance line 26 and the auxiliary capacitance electrode 33 and a liquid crystal capacitance agree with an increase and a decrease of the parasitic capacitance between the drain electrode 32 and the gate electrode 28 which are caused by the deviation of the position at which the drain electrode 32 is formed.

Laminated above each TFT 27 and the auxiliary capacitance electrodes 33 is the laminated insulating film 35, shown in FIG. 5, in which a silicon nitride film and an acrylic resin film (both not shown) are sequentially laminated. On the surface of the laminated insulating film 35, the pixel electrodes 36 are formed.

The pixel electrode 36, as shown in FIG. 4, is formed in a rectangular form whose length in the column direction is approximately three times the length in the row direction, and is provided in each pixel region 22. Note that while each pixel electrode 36 is formed in a rectangular form in the present embodiment, each pixel electrode 36 may be formed in various forms, such as a form in which part of a rectangular electrode is cut away and a form in which part of the rectangular electrode projects.

A plurality of contact holes 35a for establishing connection with the corresponding auxiliary capacitance electrodes 33 are formed in the laminated insulating film 35. The alignment of liquid crystal molecules is likely to be out of order near the contact holes 35a, and the contact holes 35a are formed to expose central portions of the corresponding auxiliary capacitance electrodes 33. This causes areas near the contact holes 35a to be shielded from light by the auxiliary capacitance lines 26 and the auxiliary capacitance electrodes 33, which suppresses decreases in contrast which are caused by light leakage. Through the contact holes 35a, the auxiliary capacitance electrodes 33 are connected to the corresponding pixel electrodes 36, so that the drain electrodes 32 of each TFT 27 are electrically connected through the auxiliary capacitance electrodes 33 to the pixel electrodes 36.

Also, the active matrix substrate 20, as shown in FIG. 1 and FIG. 2, has, in the frame portion F, for example, a mounting portion 20a whose two adjacent sides project in the form of the letter L outside of the counter substrate 40. Mounted on one side (lower side in FIG. 1) of the mounting portion 20a are, for example, a plurality of gate driver IC (integrated circuit) chips 17 each of which a given number of gate lines 25 are connected to. Mounted on the other side (left side in FIG. 1) are a plurality of source driver IC chips 18 each of which a given number of source lines 24 are connected to. Mounted on each of the sides of the mounting portion 20a are a plurality of flexible printed wiring boards (not shown) which are electrically connected to a group of gate driver IC chips 17 and a group of source driver IC chips 18 and which supply signals and power to the driver IC chips 17 and 18.

The counter substrate 40, as shown in FIG. 5, has a glass substrate 41. On the display portion D of the glass substrate 41, a plurality of color filters 42 whose colors correspond to colors of the pixels 11 are provided to overlap the corresponding pixel electrodes 36, and the black matrixes 43 are provided to partition the color filters 42. Further, on a side of the liquid crystal layer 14 of the counter substrate 40, a common electrode 44 is formed to cover the color filters 42 and the black matrixes 43.

In this way, the liquid crystal display device S is configured such that gate signals are supplied to the gate lines 25 to sequentially turn on each TFT 27, and source signals are supplied to the source lines 24 connected to the TFTs 27 in the ON state, so that potentials applied to the source electrodes 31 of the TFTs 27 is sequentially written in the corresponding pixel electrodes 36 to apply voltages to the liquid crystal layer 14 between the pixel electrodes 36 and the common electrodes 44 to control the alignment of liquid crystal molecules for every pixel 11 so as for a desired image to be displayed.

Manufacturing Method

Next, a method of manufacturing the liquid crystal display device S is described.

Figure 6:
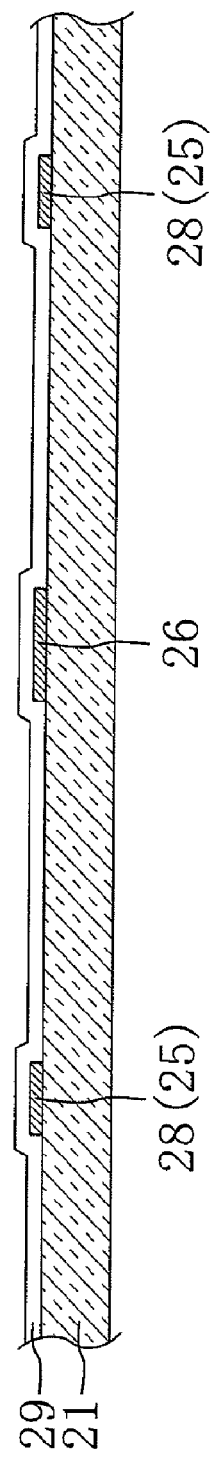
FIG. 6 is a cross-sectional view schematically showing a glass substrate in a state in which a gate insulating film is formed.
Figure 7:
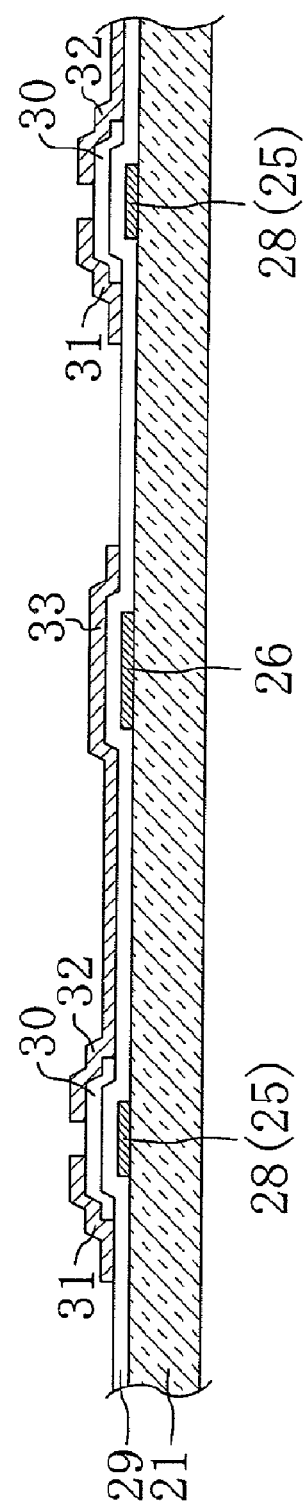
FIG. 7 is a cross-sectional view schematically showing the glass substrate in a state in which drain electrodes and an auxiliary capacitance electrode are formed.
Figure 8:
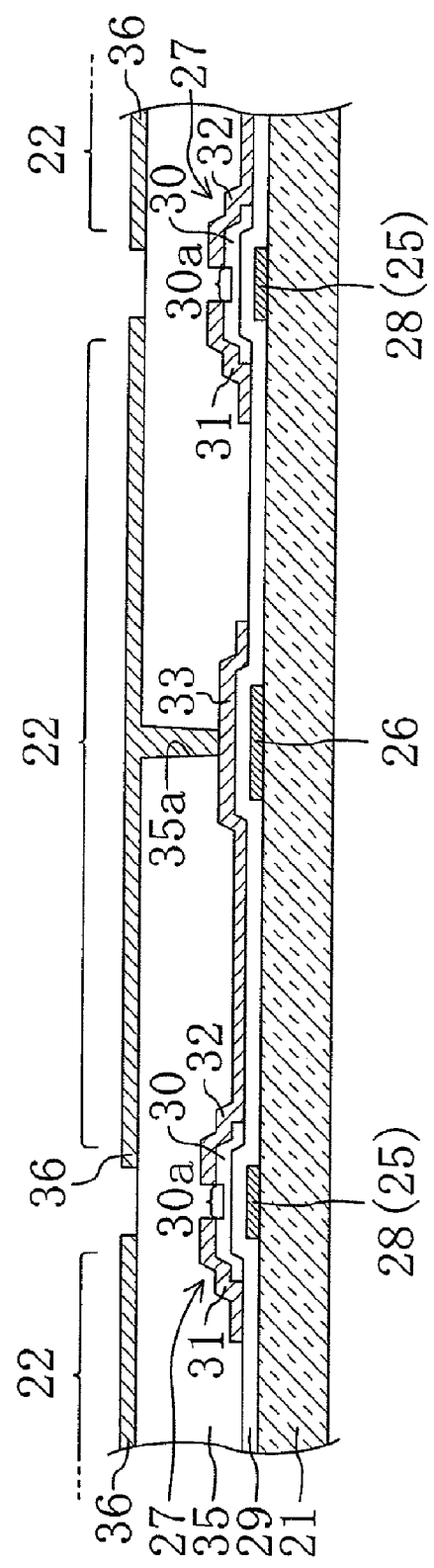
FIG. 8 is a cross-sectional view schematically showing the glass substrate in a state in which pixel electrodes are formed.

To manufacture the liquid crystal display device S, first, the active matrix substrate 20 and the counter substrate 40 are individually fabricated, and the alignment layers 37 and 45 are formed on the substrates 20 and 40, respectively. Then, both the substrates 20 and 40 are bonded to each other by using the sealing material 15, and the liquid crystal layer 14 is enclosed between both the substrates 20 and 40 by using the sealing material 15. The liquid crystal display panel 10 is thus manufactured. After the polarizing plates are attached to both surfaces of the liquid crystal display panel 10, the driver IC chips 17 and 18 and the flexible printed wiring boards are mounted thereon. The liquid crystal display device S of the invention is particularly characterized by the structure of the active matrix substrate 20, and therefore a method of manufacturing the active matrix substrate 20 is described in detail below with reference to FIGS. 6 to 8. FIGS. 6 to 8 are drawings for showing a method of manufacturing the active matrix substrate 20 and are cross-sectional views schematically showing an area corresponding to one pixel region 22 of the glass substrate 21.

To manufacture the active matrix substrate 20, a metal film (e.g., a thickness of about 50 to 500 nm) containing, for example, aluminum is formed over the entire one surface of the glass substrate 21 by a sputtering method, and then patterning of the metal film is performed by photolithography, so that the gate lines 25 (the gate electrodes 28) and the auxiliary capacitance lines 26 are formed as shown in FIG. 6.

At this point, in the photolithography, performed as the exposure process in which a resist applied onto the glass substrate 21 is exposed through a photomask is an exposure process of the step-division exposure method, in which a photomask smaller than the glass substrate 21 is disposed on the glass substrate, and exposure is performed in a divided manner using a plurality of shots while the glass substrate is moved stepwise and the photomask is replaced as necessary. For the subsequent steps of the photolithography, the exposure process of the step-division exposure method is performed although a description thereof is omitted.

Subsequently, a silicon nitride film (e.g., a thickness of about 100 to 500 nm) or the like is formed over the entire surface on which the gate lines 25 (gate electrodes 28) and the auxiliary capacitance lines 26 are formed, by a plasma CVD (chemical vapor deposition) method, so that the gate insulating film 29 is formed.

Next, an intrinsic amorphous silicon film (e.g., a thickness of about 50 to 100 nm) and an n+ amorphous silicon film (e.g., a thickness of 50 to 100 nm) in which an n-type impurity element, such as phosphorus, is doped are continuously formed over the entire surface of the gate insulating film 29 by the plasma CVD method, and then the intrinsic amorphous silicon film and the n+ amorphous silicon film are patterned in island forms on the gate electrode 28 by photolithography, so that the semiconductor layers 30 are formed as shown in FIG. 7.

Here, the semiconductor layers 30 may be formed of an amorphous silicon film as described above, but may be formed of a poly silicon film. A laser annealing process of an amorphous silicon film or a poly silicon film may be performed, so that the crystallinity improves.

Subsequently, a metal film (e.g., a thickness of about 50 to 500 nm) containing, for example, aluminum is formed over the entire surface of the gate insulating film 29 on which the semiconductor layers 30 have been formed by a sputtering method, and then the metal film is patterned by photolithography, so that the source lines 24, the source electrodes 31, the drain electrodes 32 and the auxiliary capacitance electrodes 33 are formed.

Next, by using the source electrodes 31 and the drain electrodes 32 as masks, part of the n+ amorphous silicon layer of each semiconductor layer is removed by etching to form the channel 30*a* as shown in FIG. 8, so that each TFT 27 is formed.

Next, a silicon nitride film (e.g., a thickness of about 100 to 300 nm) or the like is formed to cover each TFT 27 by a plasma CVD method, and then an acrylic resin film (e.g., a thickness of about 1000 to 5000 nm) or the like is formed by a spin coating method, so that the laminated insulating film 35 is formed.

Next, part of an area on top of each auxiliary capacitance electrode 33 in the laminated insulating film 35 is removed by etching to form each contact hole 35*a*. Then, after a transparent conductive film (e.g., a thickness of about 100 to 200 nm) made of ITO (indium tin oxide) or the like is formed over the entire surface of the laminated insulating film 35 in which each contact hole 35*a* is formed, by a sputtering method, the transparent conductive film is patterned by photolithography, so that each pixel electrode 36 is formed. As described above, the active matrix substrate 20 is manufactured.

Effects of First Embodiment

Accordingly, with the first embodiment, in each pixel region 22, the auxiliary capacitance electrode 33 is configured such that a side end on one side in a direction in which the drain electrode 32 crosses an end of the gate electrode 28 so as to enter from the outside of the gate electrode 28 to the inside thereof is disposed inside of the auxiliary capacitance line 26, and such that a side end on the other side in a direction in which the drain electrode 32 crosses the end of the gate electrode 28 so as to go out from the inside of the gate electrode 28 to the outside thereof is disposed outside of the auxiliary capacitance line 26. This enables the overlapping area of the auxiliary capacitance electrode 33 formed integrally with the drain electrode 32 and the auxiliary capacitance line 26 to vary in accordance with and together with the variation of the overlapping area of the gate electrode 28 and the drain electrode 32. That is, in cases where the drain electrode 32 deviates toward a side of the direction (lower side in FIG. 4) in which the drain electrode 32 crosses the end of the gate electrode 28 so as to enter from the outside of the gate electrode 28 to the inside thereof, which results in an increase in the overlapping area of the drain electrode 32 and the gate electrode 28, the auxiliary capacitance electrode 33 also deviates toward the side of the same direction as the drain electrode 32, which allows the overlapping area of the auxiliary capacitance electrode 33 and the auxiliary capacitance line 26 to be increased by the amount corresponding to the deviation of the drain electrode 32. Alternatively, in cases where the drain electrode 32 deviates toward a side of the direction (upper side in FIG. 4) in which the drain electrode 32 crosses the end of the gate electrode 28 so as to go out from the inside of the gate electrode 28 to the outside thereof, which results in a decrease in the overlapping area of the drain electrode 32 and the gate electrode 28, the auxiliary capacitance electrode 33 also deviates toward the side of the same direction as the drain electrode 32, which allows the overlapping area of the auxiliary capacitance electrode 33 and the auxiliary capacitance line 26 to be decreased by the amount corresponding to the deviation of the drain electrode 32. Accordingly, since an auxiliary capacitance between the auxiliary capacitance electrode 33 and the auxiliary capacitance line 26 can be increased and decreased in accordance with an increase and a decrease of a parasitic capacitance between the gate electrode 28 and the drain electrode 32, effects of the parasitic capacitance and the auxiliary capacitance on the feedthrough voltage cancel each other. As a result, if lines 24, 25 and 26 and electrodes 28, 31, 32 and 33 are formed by photolithography including an exposure process of a step-division exposure method, the variation of the feedthrough voltage generated by the parasitic capacitance between the gate electrode 28 and the drain electrodes 32 can be suppressed among a plurality of blocks defined for areas on the glass substrate which are exposed in the corresponding shots. This makes it difficult for brightness irregularities among blocks to be visually recognized on a display screen.

Second Embodiment of The Invention

Figure 9:
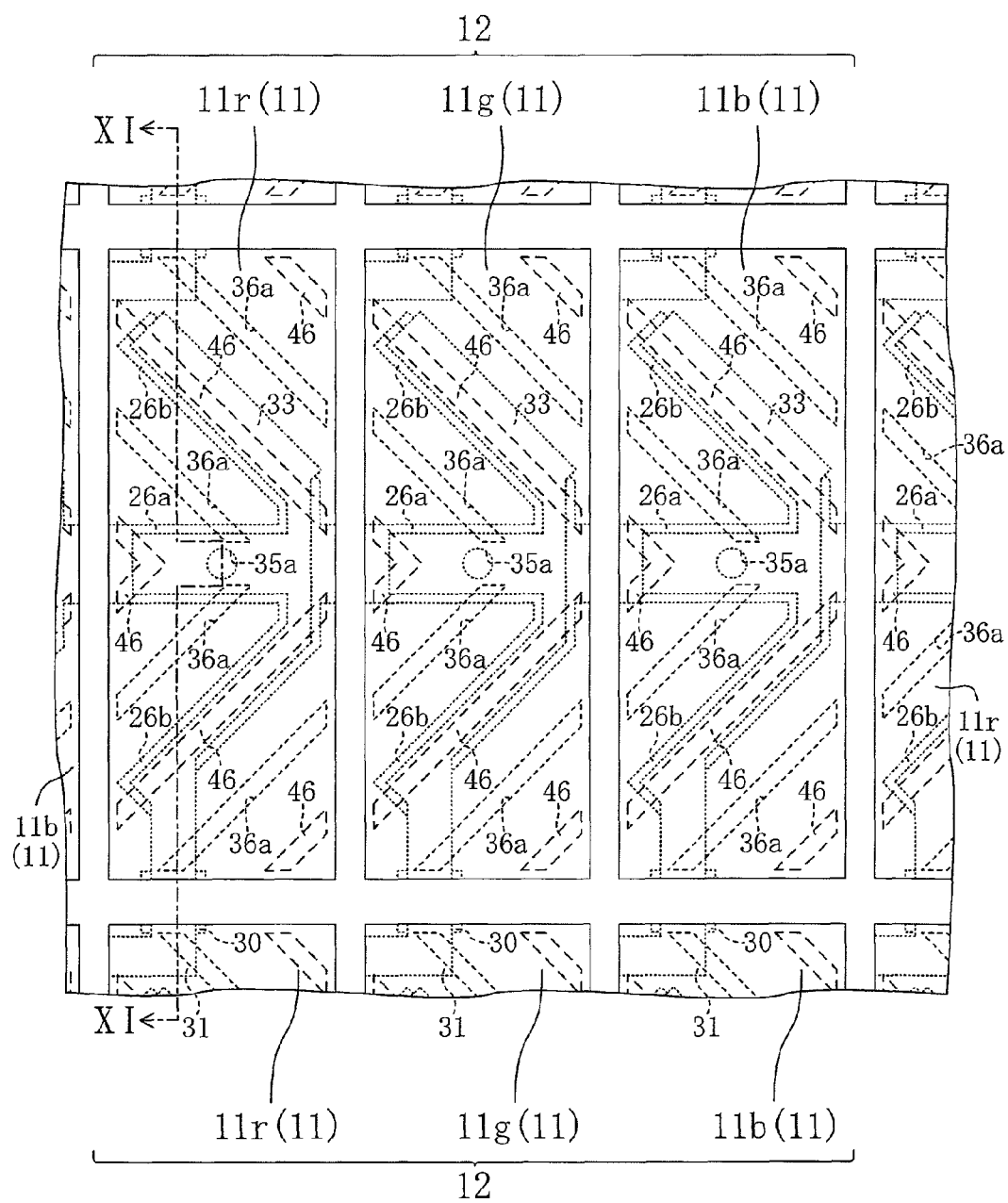
FIG. 9 is a plan view schematically showing, on an enlarged scale, part of a display portion of a liquid crystal display device in a second embodiment.
Figure 10:
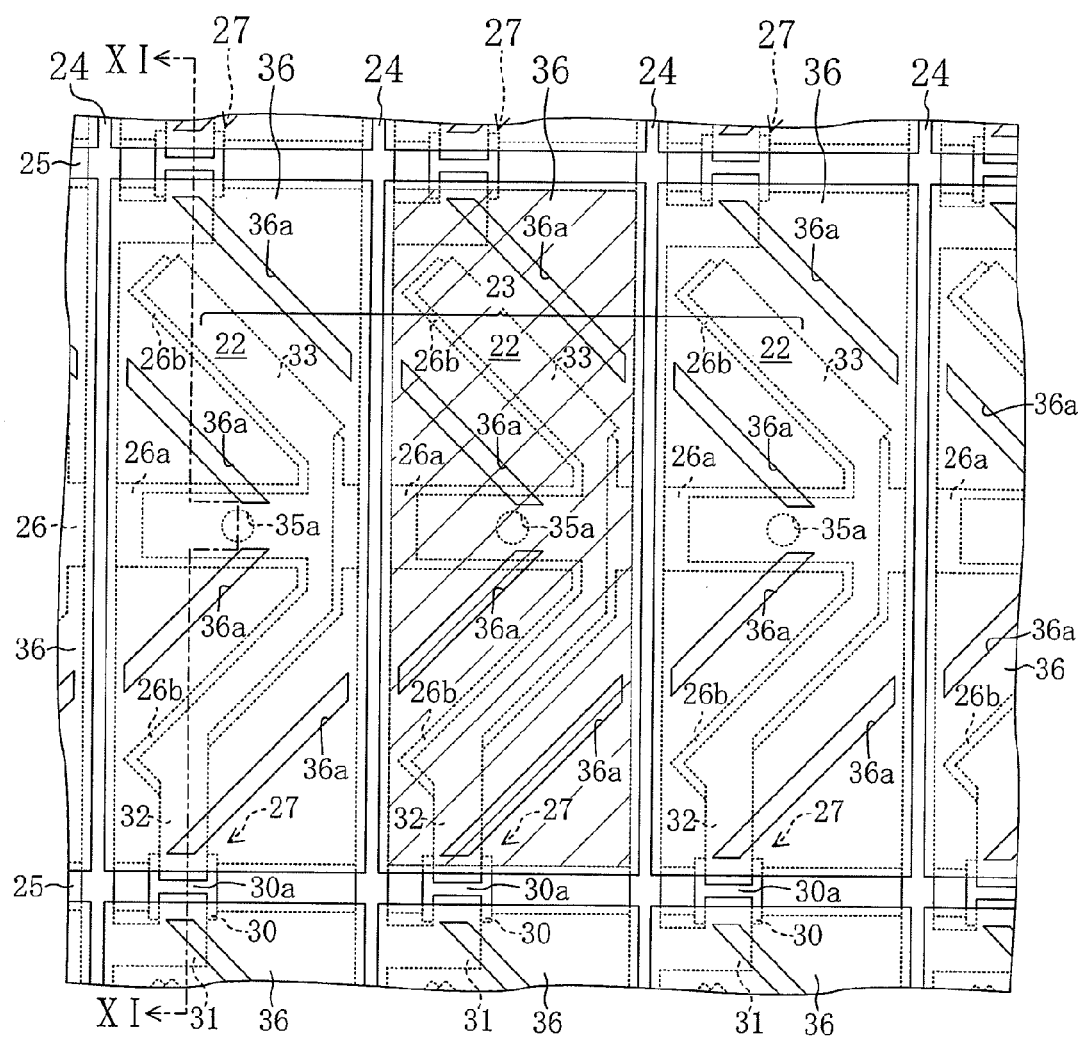
FIG. 10 is a plan view schematically showing, on an enlarged scale, part of an active matrix substrate in the second embodiment.
Figure 11:
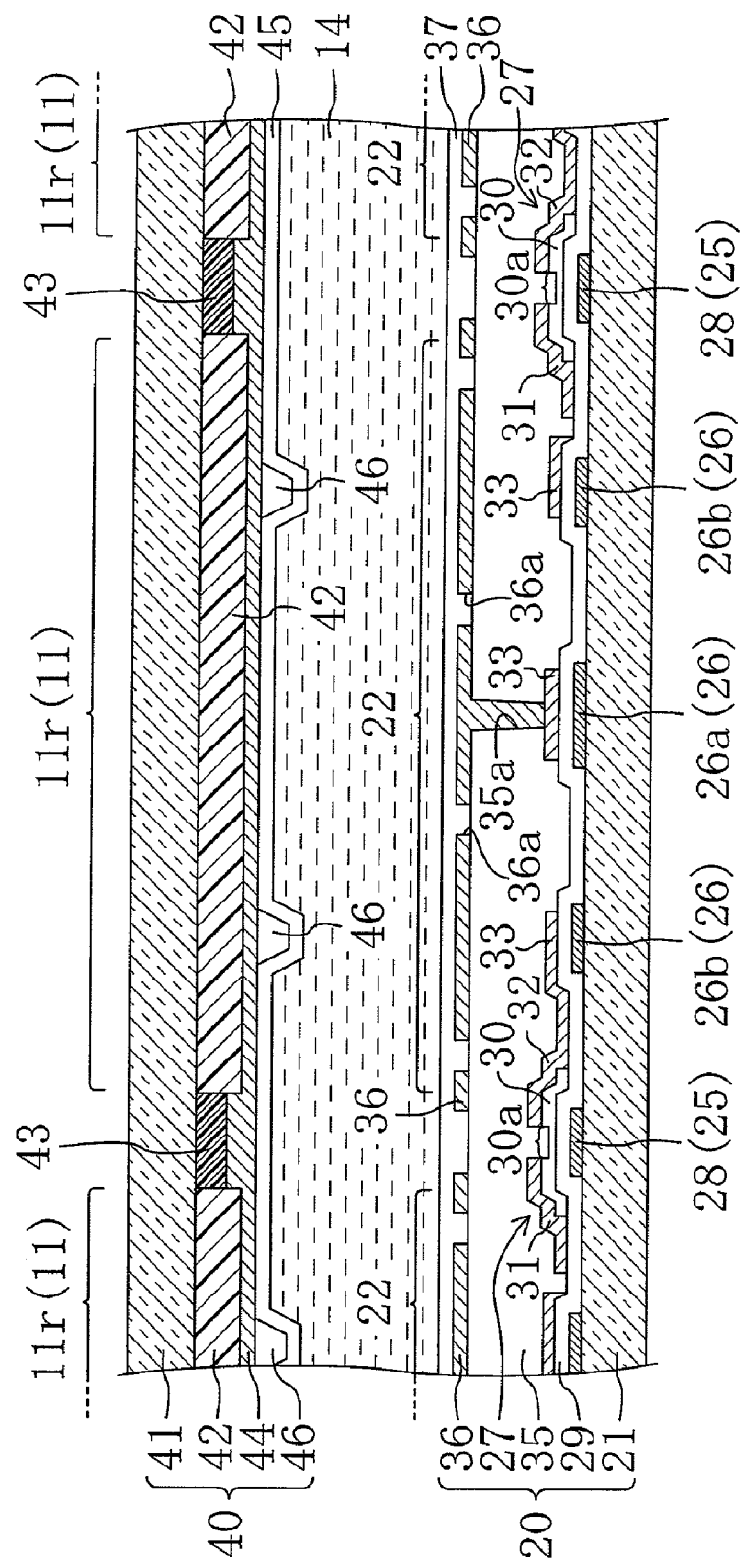
FIG. 11 is a schematic cross-sectional view taken along the line XI-XI of FIG. 9.

FIGS. 9 to 11 show the second embodiment of the invention. Note that, in the following embodiments, the same parts as those in FIGS. 1 to 8 are denoted by the same reference characters, and the detailed description thereof is omitted. FIG. 9 is a plan view schematically showing one pixel group 12 of the liquid crystal display device S of the present embodiment. FIG. 10 is a plan view schematically showing one pixel region group 23 of the active matrix substrate 20 of the present embodiment. FIG. 11 is a cross-sectional view schematically showing the liquid crystal display device S, taken along the line XI-XI of FIG. 9.

The liquid crystal display device S of the present embodiment is a liquid crystal display device of what is called MVA (multidomain vertical alignment) method. The liquid crystal layer 14 is made of a vertical alignment type nematic liquid crystal material having a negative dielectric anisotropy, and each of the alignment layers 37 and 45 is a vertical alignment layer.

On the sides of the liquid crystal layer 14 of the active matrix substrate 20 and the counter substrate 40, as shown in FIG. 9 and FIG. 11, a plurality of alignment regulating portions 36*a* and 46 for dividing the liquid crystal layer 14 into a plurality of domains for each pixel region 22, that is, in each pixel 11 are provided, respectively. The alignment regulating portions 36*a* of the active matrix substrate 20, as shown in FIG. 10 and FIG. 11, are formed of slits of openings formed in each pixel electrode 36. The alignment regulating portions 46 of the counter substrate 40, as shown in FIG. 11, include projections formed to project toward the liquid crystal layer 14, and are provided between the common electrode 44 and the vertical alignment layer 45.

The slits 36*a* and the projections 46, as shown in FIG. 9, are linearly formed to extend in oblique directions with respect to the gate line 25 and the source line 24. In each pixel 11, the slits 36*a* and the projections 46 are, in the upper half region in FIG. 9, each formed to extend from upper left to lower right in the drawing and are alternately arranged from upper right toward lower left in the drawing, whereas they are, in the lower half region in FIG. 9, each formed to extend from upper right to lower left in the drawing and are alternately arranged from upper left toward lower right in the drawing.

Each auxiliary capacitance line 26 of the active matrix substrate 20 of the present embodiment, as shown in FIG. 10, has a capacitance main line 26*a* provided to extend along the gate lines 25 and a plurality of capacitance branch lines 26b provided to project from the capacitance main line 26a to both sides thereof.

The capacitance branch lines 26b, as shown in FIG. 9 and FIG. 11, are formed to overlap the corresponding projections 46, and are formed to extend in the oblique directions with respect to the corresponding source lines 24 and gate lines 25. That is, part of a plurality of projections 46 is formed to overlap the capacitance branch lines 26b. Note that while the capacitance branch lines 26b are shown thicker than the alignment regulating portions 36a and 46 in FIG. 9 and FIG. 10, the capacitance branch lines 26b may be formed to have a thickness equal to those of the alignment regulating portions 36a and 46 or larger than those of the alignment regulating portions 36a and 46.

The auxiliary capacitance electrodes 33, as shown in FIG. 10, extend along the capacitance main line 26a and the capacitance branch lines 26b and are provided to overlap both the capacitance main line 26a and the capacitance branch lines 26b. In each pixel region 22, the auxiliary capacitance electrode 33 is configured, just in one portion along the capacitance branch line 26b on the upper side in FIG. 10 among portions along the capacitance main line 26a and the capacitance branch lines 26b, such that a side end on one side (lower side in FIG. 10) in a direction in which the drain electrode 32 crosses the end of the gate electrode 28 so as to enter from the outside of the gate electrode 28 to the inside thereof is disposed along the side end on the one side of the capacitance branch line 26b to be inside of the auxiliary capacitance line 26, and such that a side end on the other side (upper side in FIG. 10) in a direction in which the drain electrode 32 crosses the end of the gate electrode 28 so as to go out from the inside of the gate electrode 28 to the outside thereof is disposed along the side end on the other side of the capacitance branch line 26b to be outside of the auxiliary capacitance line 26.

Effects of Second Embodiment

Accordingly, with this second embodiment, in each pixel region 22, the auxiliary capacitance electrode 33 is configured such that the side end on one side in the direction in which the drain electrode 32 crosses the end of the gate electrode 28 so as to enter from the outside of the gate electrode 28 to the inside thereof is disposed inside of the auxiliary capacitance line 26, and such that the side end on the other side in the direction in which the drain electrode 32 crosses the end of the gate electrode 28 so as to go out from the inside of the gate electrode 28 to the outside thereof is disposed outside of the auxiliary capacitance line 26. Therefore, similar effects to those in the above the first embodiment can be obtained.

In addition to this matter, since the vertical alignment layers 37 and 45 and a plurality of alignment regulating portions 36a and 46 for dividing the liquid crystal layer 14 into a plurality of domains for each pixel 14 are provided on the sides of the liquid crystal layer 14 of the active matrix substrate 20 and the counter substrate 40, respectively, when a voltage is not applied to the liquid crystal layer 14, just liquid crystal molecules near the slits 36a and the projections 46 are aligned in a tilted manner centered at the slits 36a and the projections 46, and all other liquid crystal molecules apart from the slits 36a and the projections 46 are aligned perpendicular to the surface of the active matrix substrate 20 (counter substrate 40). When a voltage is applied to the liquid crystal layer 14, liquid crystal molecules apart from the slits 36a and the projections 46 are aligned in accordance with the tilted alignment of the liquid crystal molecules near the slits 36a and the projections 46. This can suppress the amount of transmitted light which varies with the angle of visual recognition, thereby allowing improvement of visual angle characteristics during displaying an image. This improvement allows the viewing angle to increase.

Further, since each auxiliary capacitance electrode 33 is provided to overlap both the capacitance main line 26a and the capacitance branch line 26b, the overlapping area of the auxiliary capacitance electrode 33 and the auxiliary capacitance line 26 becomes large, which results in an increase in auxiliary capacitance to decrease the feedthrough voltage. In addition to this matter, by lengthening a portion which crosses a side end of the auxiliary capacitance line 26 in the auxiliary capacitance electrode 33, it becomes possible to increase the auxiliary capacitance which increases and decreases in accordance with an increase and a decrease in parasitic capacitance between the gate electrode 28 and the drain electrode 32. This enables an increase and a decrease of the auxiliary capacitance with respect to an increase and a decrease in parasitic capacitance between the gate electrode 28 and the drain electrode 32 to be appropriately adjusted, which enables variations of the feedthrough voltage to be suppressed as much as possible.

In areas where the alignment regulating portions 36a and 46 are provided, the alignment of liquid crystal molecules is likely to be out of order, and therefore light transmittance is likely to decrease and light leakage is likely to occur. In areas where the auxiliary capacitance line 26 and the auxiliary capacitance electrode 33 are provided, the auxiliary capacitance line 26 and the auxiliary capacitance electrode 33 block light transmission to decrease the light transmittance. In the present embodiment, part of the plurality of projections 46 is formed to overlap the corresponding capacitance branch lines 26b. Therefore, compared to cases where the plurality of projections 46 are formed so as not to overlap either the auxiliary capacitance lines 26 or the auxiliary capacitance electrodes 33, it is possible in this embodiment to suppress the decrease in light transmittance, and suppress light leakage from the areas where liquid crystal molecules are likely to be out of alignment, so that contrast can be increased.

Third Embodiment of the Invention

Figure 12:
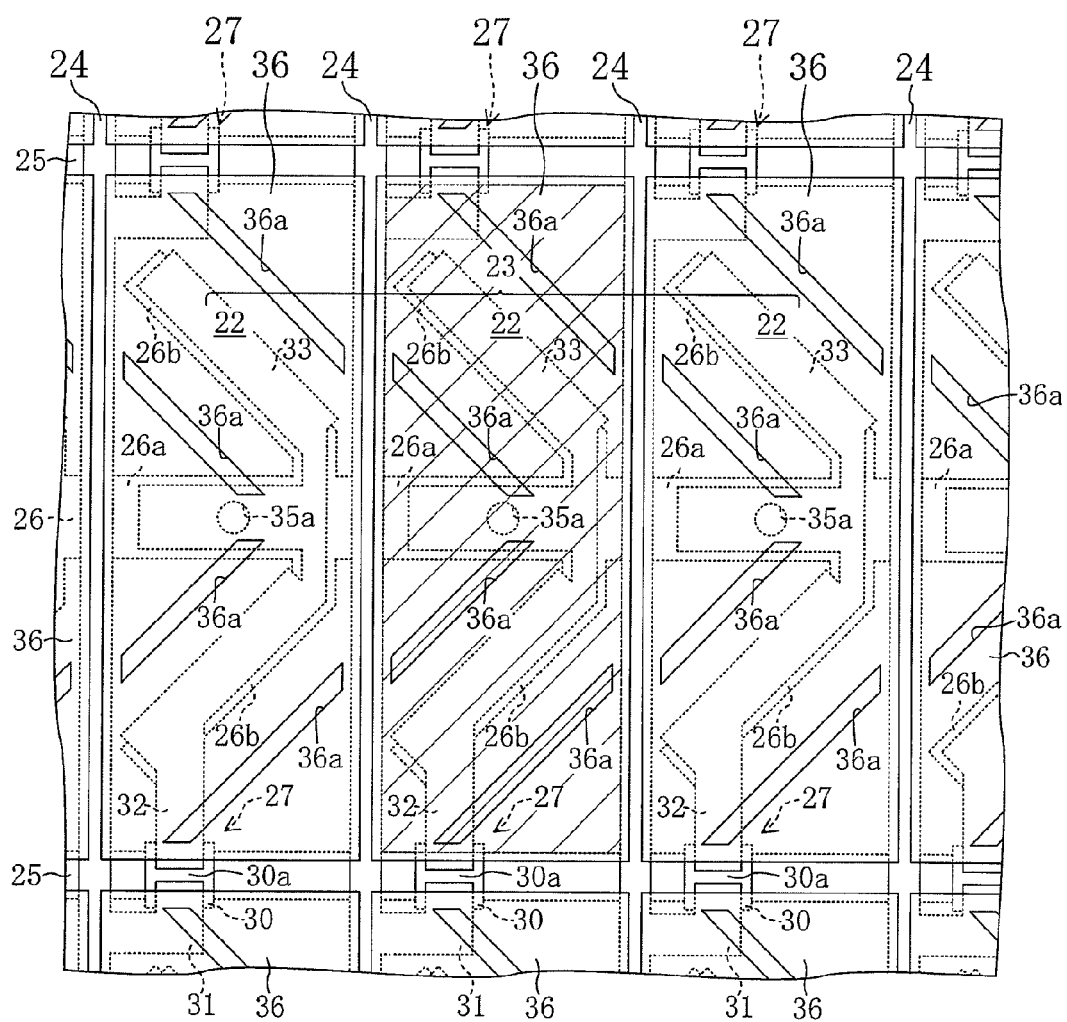
FIG. 12 is a plan view schematically showing, on an enlarged scale, part of an active matrix substrate in a third embodiment.

FIG. 12 shows the third embodiment of the invention. FIG. 12 is a plan view schematically showing one pixel region group 23 of the active matrix substrate 20 of the present embodiment.

The liquid crystal display device S in the present third embodiment, as in the above the second embodiment, is an MVA liquid crystal display device. In the auxiliary capacitance electrode 33 of each pixel region 22, a side end on one side in the direction in which the drain electrode 32 crosses the end of the gate electrode 28 so as to enter from the outside of the gate electrode 28 to the inside thereof is disposed inside of the auxiliary capacitance line 26, and a side end on the other side in the direction in which the drain electrode 32 crosses the end of the gate electrode 28 so as to go out from the inside of the gate electrode 28 to the outside thereof is disposed outside of the auxiliary capacitance line 26.

In the above second embodiment, in each auxiliary capacitance electrode 33, the side end on one side just in one portion along the capacitance branch line 26b on the upper side in FIG. 10 among portions along the capacitance main line 26a and the capacitance branch lines 26b is disposed inside of the auxiliary capacitance line 26, and the side end on the other side is disposed outside of the auxiliary capacitance line 26.

In the present embodiment, however, in each auxiliary capacitance electrode 33, as shown in FIG. 12, side ends on the one side (lower side in the drawing) in a plurality of portions along the capacitance branch lines 26b on both sides in the upper and lower directions in the drawing are disposed along the side ends on one side of the capacitance branch lines 26b to be inside of the auxiliary capacitance line 26, and side ends of the other side (upper side in the drawing) are disposed along the side ends on the other side of the capacitance branch lines 26b to be outside of the auxiliary capacitance line 26.

Effects of Third Embodiment

Accordingly, with this third embodiment, in each pixel region 22, the auxiliary capacitance electrode 33 is configured such that the side end on one side in the direction in which the drain electrode 32 crosses the end of the gate electrode 28 so as to enter from the outside of the gate electrode 28 to the inside thereof is disposed inside of the auxiliary capacitance line 26, and such that the side end on the other side in the direction in which the drain electrode 32 crosses the end of the gate electrode 28 so as to go out from the inside of the gate electrode 28 to the outside thereof is disposed outside of the auxiliary capacitance line 26. Therefore, similar effects to those in the above first embodiment can be obtained.

Further, in a plurality of portions along the capacitance branch lines 26b among portions along the capacitance main line 26a and the capacitance branch lines 26b in each auxiliary capacitance electrode 33, side ends on the one side are disposed inside of the auxiliary capacitance line 26, and side ends on the other side are disposed outside of the auxiliary capacitance line 26. This increases the auxiliary capacitance, which increases and decreases in accordance with an increase and a decrease in parasitic capacitance between the gate electrode 28 and the drain electrode 32, more than the case in which, in one portion among portions along the capacitance main line 26a and the capacitance branch lines 26b, the side end on the one side is disposed inside of the auxiliary capacitance line 26, and the side end on the other side is disposed outside of the auxiliary capacitance line 26. Thus, an increase and a decrease of the auxiliary capacitance with respect to an increase and a decrease in parasitic capacitance between the gate electrode 28 and the drain electrode 32 is appropriately adjusted, which enables variations of the feedthrough voltage to be suppressed as much as possible.

Fourth Embodiment of the Invention

Figure 13:
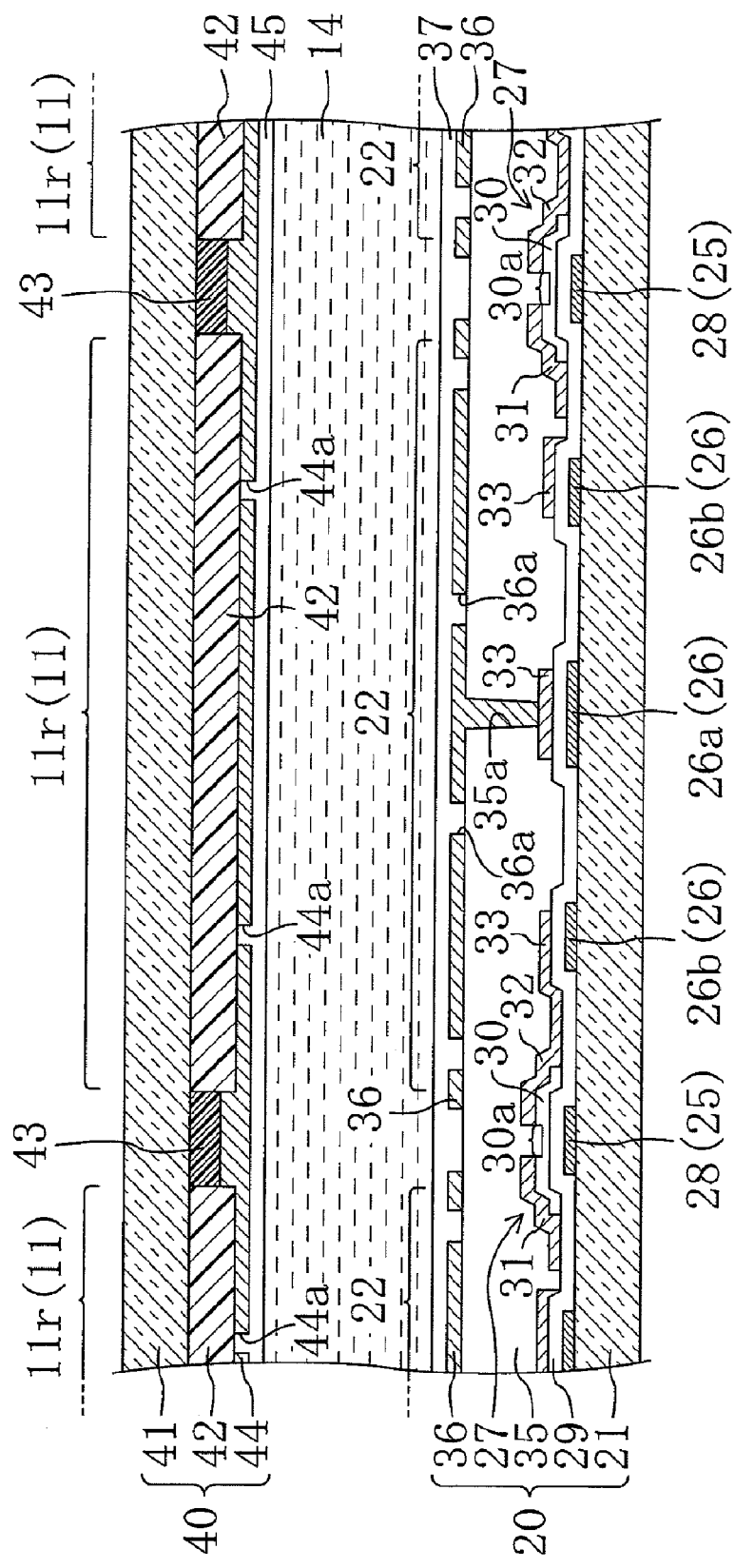
FIG. 13 is a cross-sectional view schematically showing, on an enlarged scale, part of a display portion of a liquid crystal display device in a fourth embodiment.

FIG. 13 shows the fourth embodiment of the invention. FIG. 13 is a plan view schematically showing one pixel region 22 of the active matrix substrate 20 of the present embodiment.

While the MVA liquid crystal display devices S have been described in the above second and third embodiments, the liquid crystal display device S in the present embodiment is a liquid crystal display device of what is called PVA (patterned vertical alignment) method.

The active matrix substrate 20 is configured in the same manner as the above second embodiment. The alignment regulating portions 36a and 44a of the active matrix substrate 20 and the counter substrate 40 are disposed in the same manner as the above second embodiment, and the alignment regulating portions 36a of the active matrix substrate 20 are made of slits formed in the corresponding pixel electrodes 36.

Alignment regulating portions 44a of the counter substrate 40, as shown in FIG. 13, are made of slits formed in the common electrode 44.

Note that the active matrix substrate 20 may be configured in the same manner as the above third embodiment.

Effects of Fourth Embodiment

Accordingly, in this fourth embodiment, the active matrix substrate 20 is configured in the same manner as the above second embodiment, and therefore the effects similar to those of the above first embodiment can be obtained.

Even with the alignment regulating portions 36a and 44a of both the active matrix substrate 20 and the counter substrate 40 being made of slits, when a voltage is not applied to the liquid crystal layer 14, just liquid crystal molecules near the slits 36a and 44a are aligned in a tilted manner centered at the slits 36a and 44a, and all other liquid crystal molecules apart from the slits 36a and 44a are aligned perpendicular to the surface of the active matrix substrate 20 (counter substrate 40). When a voltage is applied to the liquid crystal layer 14, liquid crystal molecules apart from the slits 36a and 44a are aligned in accordance with the tilted alignment of the liquid crystal molecules near the slits 36a and 44a. This can suppress the amount of transmitted light which varies with the angle of visual recognition, thereby allowing visual angle characteristics to be improved during displaying an image. This improvement allows the viewing angle to be increased.

Fifth Embodiment of the Invention

Figure 14:
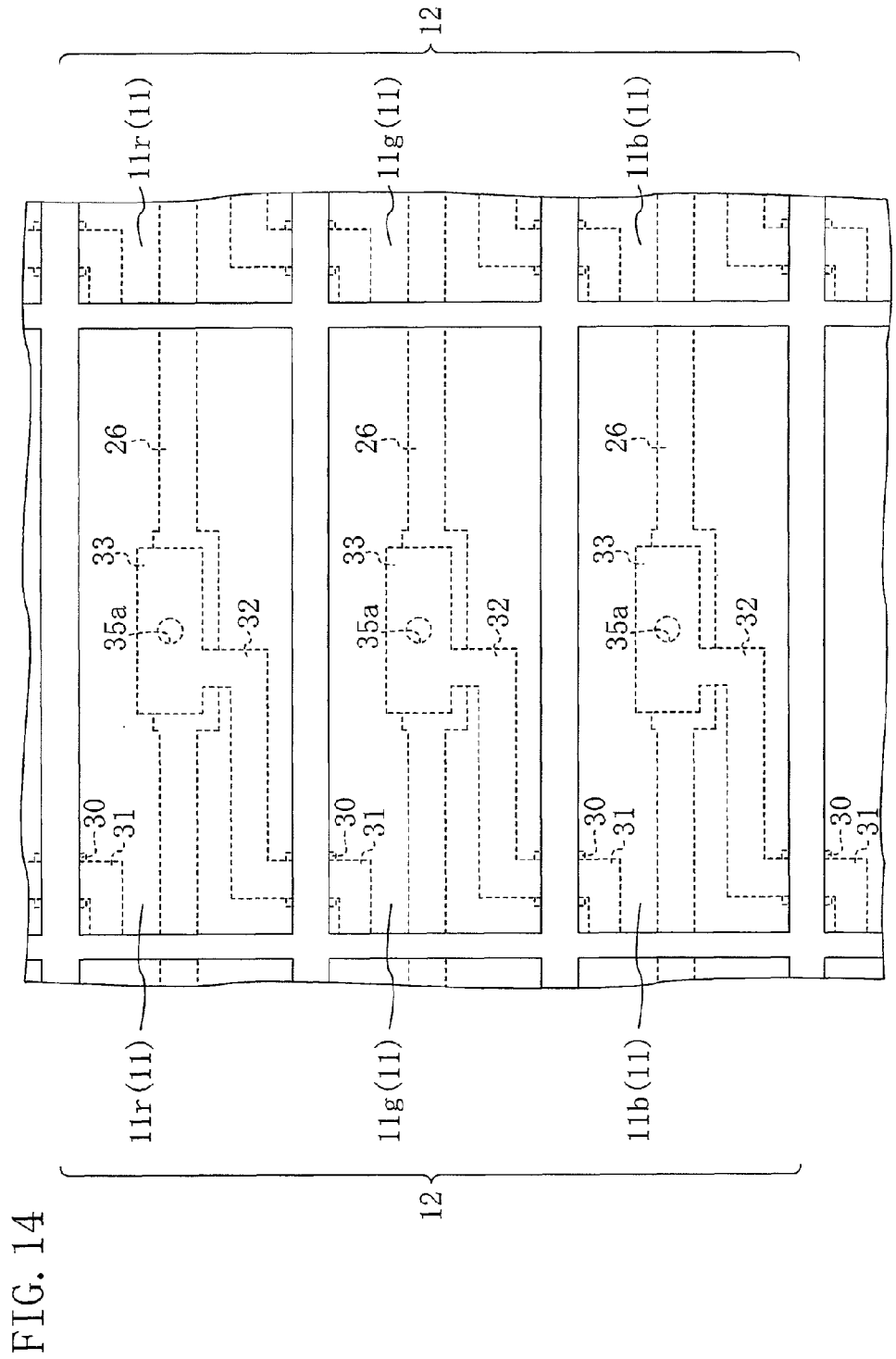
FIG. 14 is a plan view schematically showing, on an enlarged scale, part of a display portion of a liquid crystal display device in a fifth embodiment.
Figure 15:
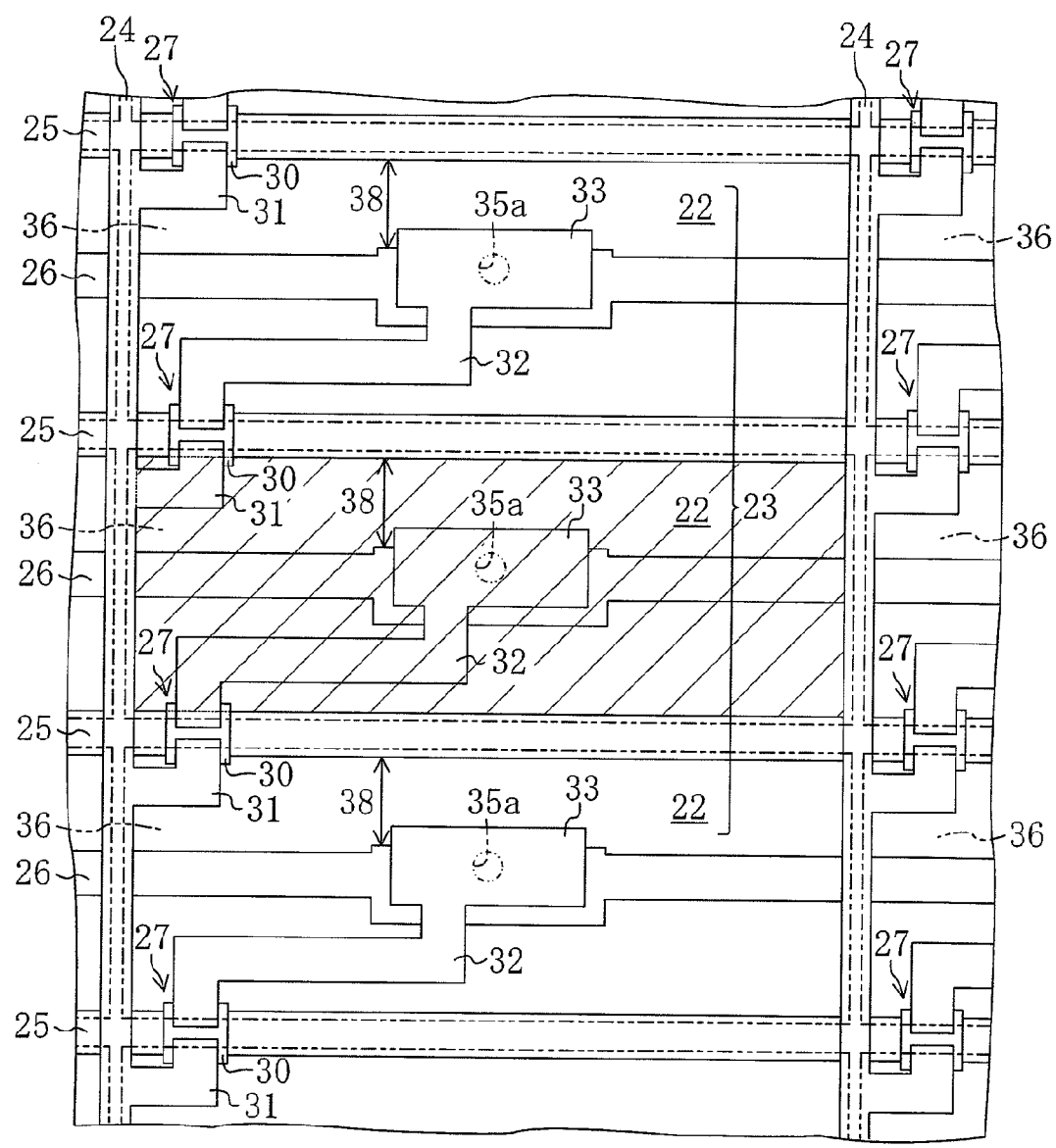
FIG. 15 is a plan view schematically showing, on an enlarged scale, part of an active matrix substrate in the fifth embodiment.

FIGS. 14 and 15 show the fifth embodiment of the invention. FIG. 14 is a plan view schematically showing one pixel group 12 of the liquid crystal display device S in the present embodiment. FIG. 15 is a plan view schematically showing one pixel region group 23 of the active matrix substrate 20 in the present embodiment.

A plurality of pixels 11 of the present embodiment, as shown in FIG. 14, are included in a plurality of pixel groups 12 such that the pixels 11r, 11g and 11b in a plurality of colors which are arranged in the form of stripes in the column direction and which are aligned along the source lines 24 are included in each pixel group 12. Each pixel 11 is provided such that the length in the row direction is approximately three times the length in the column direction.

In the above first embodiment, each TFT 27 in each pixel region group 23 are connected to the source lines 24 which are different from one another and are connected to the same gate line 25. In the present embodiment, however, as shown in FIG. 15, each TFT 27 in each pixel region group 23 is configured such that the source electrodes 31 are connected to the same source line 24, and the gate electrodes 28 are connected to the gate lines 25 which differ from one another.

Like the above first embodiment, in each pixel region 22, the auxiliary capacitance electrode 33 is configured such that a side end on one side (lower side in FIG. 15) in a direction in which the drain electrode 32 crosses the end of the gate electrode 28 so as to enter from the outside of the gate electrode 28 to the inside thereof is disposed inside of the auxiliary capacitance line 26, and such that a side end on the other side (upper side in FIG. 15) in a direction in which the drain electrode 32 crosses the end of the gate electrode 28 so as to go out from the inside of the gate electrode 28 to the outside thereof is disposed outside of the auxiliary capacitance line 26.

Effects of Fifth Embodiment

Accordingly, with this fourth embodiment, in each pixel region 22, the auxiliary capacitance electrode 33 is configured such that the side end on one side in the direction in which the drain electrode 32 crosses the end of the gate electrode 28 so as to enter from the outside of the gate electrode 28 to the inside thereof is disposed inside of the auxiliary capacitance line 26, and such that the side end on the other side in the direction in which the drain electrode 32 crosses the end of the gate electrode 28 so as to go out from the inside of the gate electrode 28 to the outside thereof is disposed outside of the auxiliary capacitance line 26. Therefore, similar effects to those in the above first embodiment can be obtained.

Figure 19:
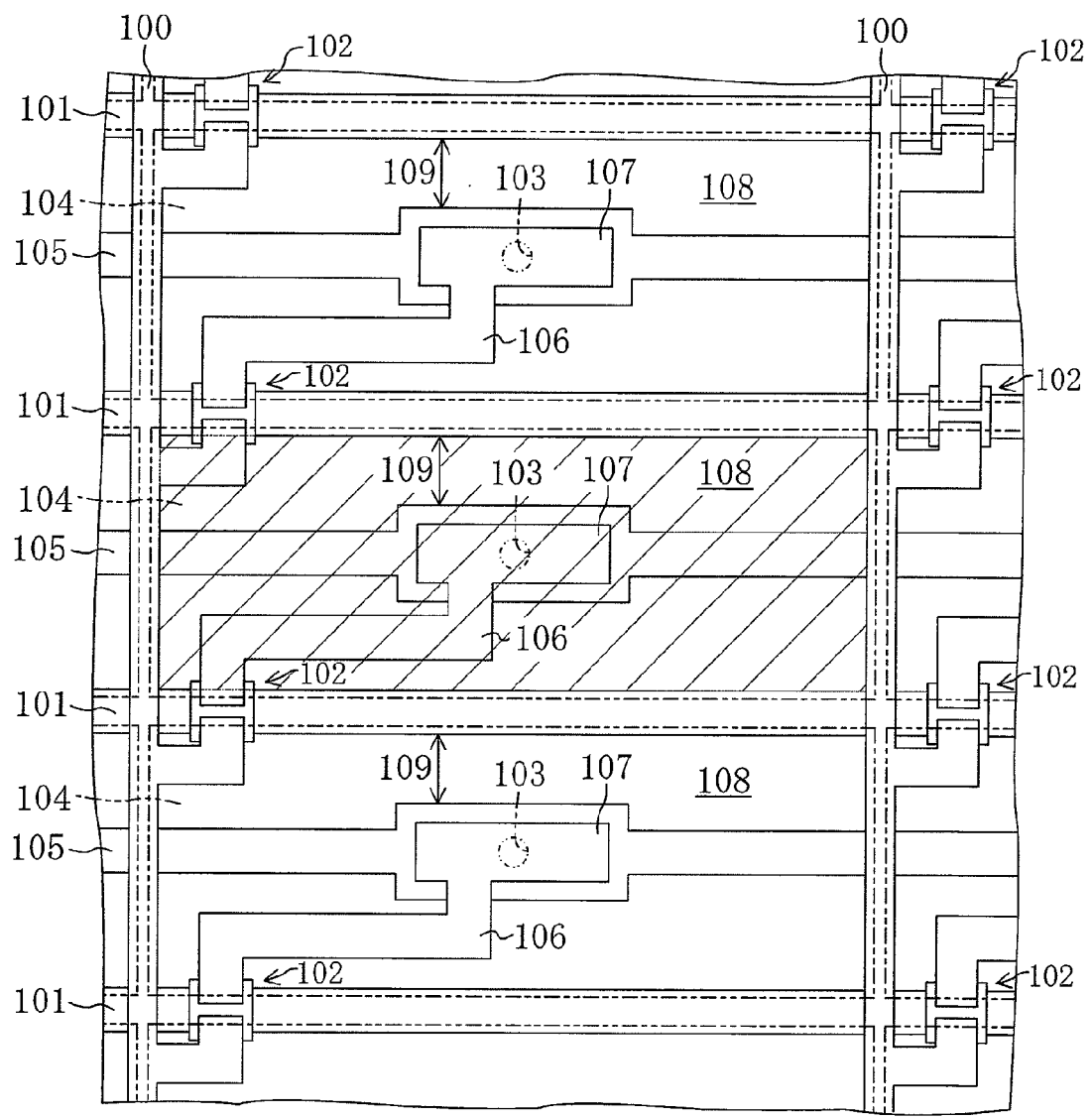
FIG. 19 is a plan view schematically showing, on an enlarged scale, part of a conventional active matrix substrate in which the length in the row direction in each pixel region is provided to be approximately three times the length in the column direction.

As shown in FIG. 19, regarding a conventional active matrix substrate, in cases where the length in the row direction in each pixel region 108 is provided to be approximately three times the length in the column direction, intervals 109 between the gate lines 101 and the auxiliary capacitance lines 105 are made smaller than those in cases where the length in the column direction in each pixel region is approximately three times the length in the row direction, from the viewpoint of fully shielding areas near the contact holes 103 of the laminated insulating film from light by the auxiliary capacitance lines 105. This causes the lines 101 and 105 to be easily short-circuited to each other, and therefore the yields tend to decrease.

In contrast, in the present embodiment, as shown in FIG. 15, in each pixel region 22, a side end of the auxiliary capacitance electrode 33 on a side (upper side in the drawing) of the direction in which the drain electrode 32 crosses the end of the gate electrode 28 so as to go out from the inside of the gate electrode 28 to the outside thereof is disposed outside of the auxiliary capacitance line 26. This enables light shielding for the contact hole 35a to be fully performed by the auxiliary capacitance electrode 33 in an area on the side where the auxiliary capacitance electrode 33 is disposed outside of the auxiliary capacitance line 26, and therefore the decrease of intervals 38 between the gate lines 25 and the auxiliary capacitance lines 26 can be suppressed, so that mutual short-circuiting between the lines 25 and 26 can be suppressed.

Further, in each pixel region group 23, the source electrodes 31 are connected to the same source line 24, and the gate electrodes 28 are connected to the gate lines 25 which differ from one another. Therefore, the number of source lines 24 connected to the source electrode 31 of each pixel region group 23 can be made smaller than that in cases where, in each pixel region group 23, the source electrodes 31 are connected to the source lines 24 which differ from one another and the gate electrodes 28 are connected to the same gate line 25. This enables the number of source driver IC chips 18, which are more expensive than the gate driver IC chips 17, to be decreased, and therefore cost can be reduced.

Other Embodiments

Figure 16:
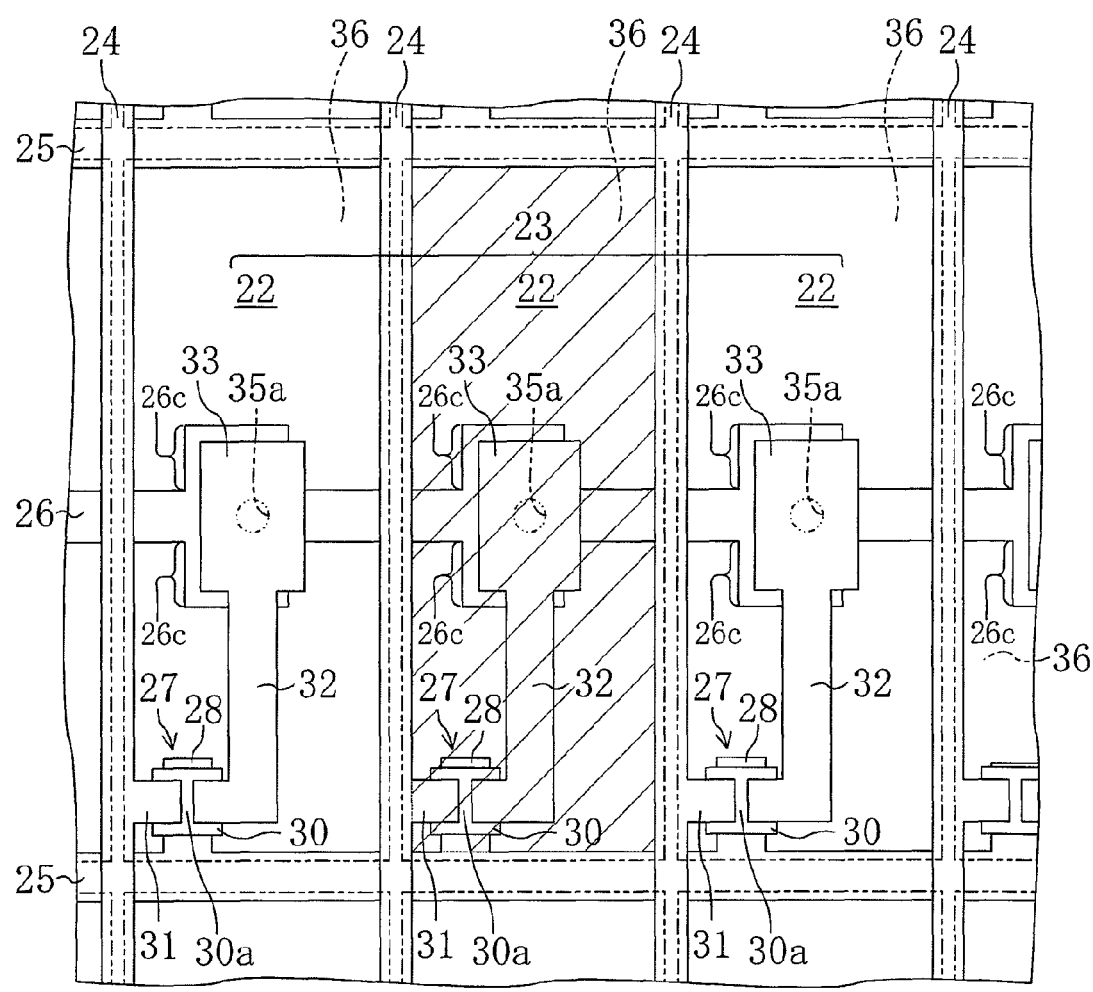
FIG. 16 is a plan view schematically showing, on an enlarged scale, part of an active matrix substrate in another embodiment.
Figure 17:
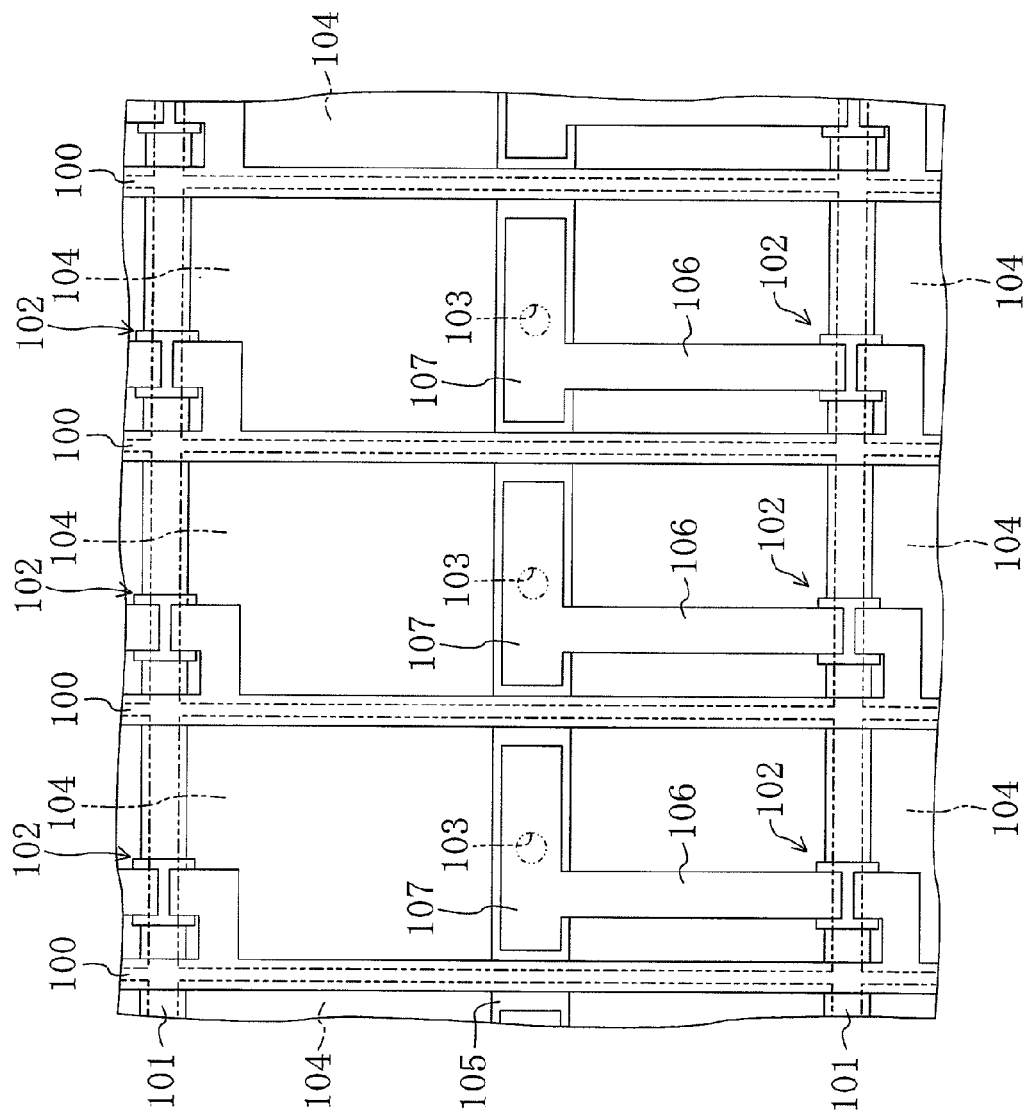
FIG. 17 is a plan view schematically showing, on an enlarged scale, part of a conventional active matrix substrate.
Figure 18:
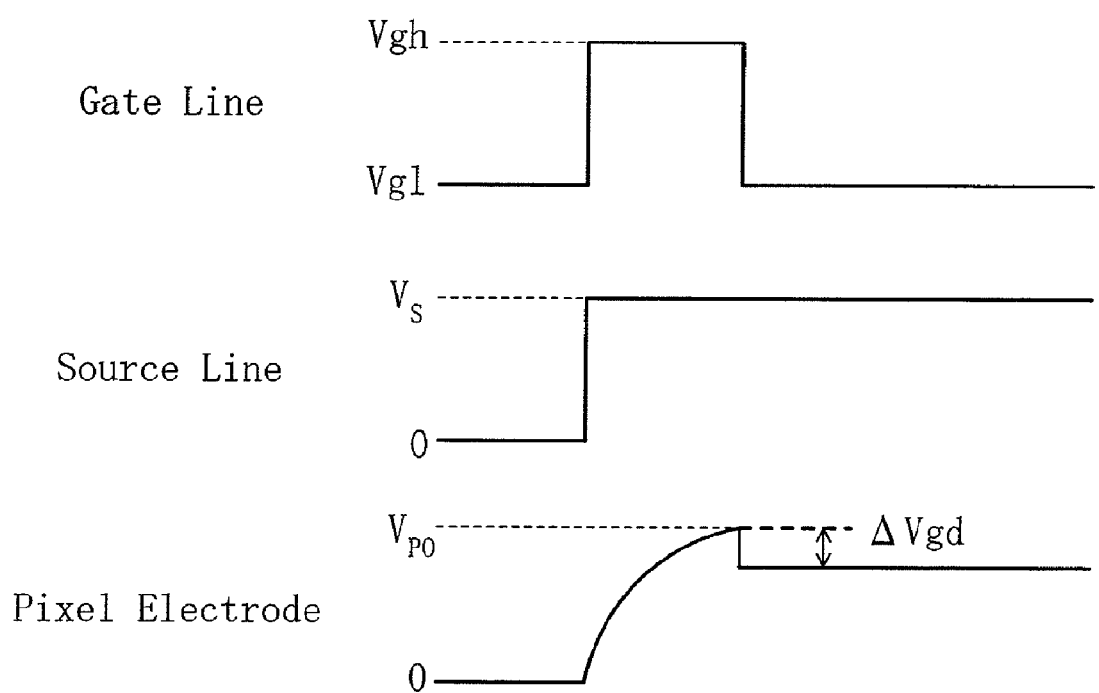
FIG. 18 shows a relationship among signal patterns which are applied to a gate line, a source line and a pixel electrode, respectively.

In the above embodiments, the auxiliary capacitance electrode 33 in each pixel region 22 is disposed such that the auxiliary capacitance between the auxiliary capacitance line 26 and the auxiliary capacitance electrode 33 increases and decreases in accordance with an increase and a decrease of the parasitic capacitance between the gate electrode 28 and the drain electrode 32 which are caused by the deviation in the column direction of the position at which the drain electrode 32 is integrally formed. However, the invention is not limited to this. As shown in FIG. 16, the auxiliary capacitance electrode 33 in each pixel region 22 may be disposed such that the auxiliary capacitance between the auxiliary capacitance line 26 and the auxiliary capacitance electrode 33 increases and decreases in accordance with an increase and a decrease of the parasitic capacitance between the gate electrode 28 and the drain electrode 32 which are caused by the deviation in the row direction (the lateral direction in the drawing) of the position at which the drain electrode 32 is integrally formed.

Specifically, as shown in FIG. 16, each gate electrode 28 is provided to project from the gate line 25 on a side of the auxiliary capacitance line 26 (upper side in the drawing), each semiconductor layer 30 is provided to overlap the gate electrode 28, and, in each pixel region 22, a side end on one side (left side in the drawing) of the drain electrode 32 is disposed inside of the semiconductor layer 30, and a side end on the other side (right side in the drawing) is disposed outside of the semiconductor layer 30. In each auxiliary capacitance line 26, a swell 26c which swells in the column direction is provided in a portion overlapping the auxiliary capacitance electrode 33. In each pixel region 22, the auxiliary capacitance electrode 33 may be configured such that a side end on one side (left side in FIG. 16) in the direction in which the drain electrode 32 crosses the end of the gate electrode 28 so as to enter from outside of the gate electrode 28 to inside thereof is disposed along a side end on one side of the swell 26c in the auxiliary capacitance line 26 to be inside of the auxiliary capacitance line 26, and such that a side end on the other side (right side in FIG. 16) in the direction in which the drain electrode 32 crosses the end of the gate electrode 28 so as to go out from the inside of the gate electrode 28 to the outside thereof is disposed along a side end on the other side of the swell 26c to be outside of the auxiliary capacitance line 26.

With such a configuration, since the auxiliary capacitance between the auxiliary capacitance electrode 33 and the auxiliary capacitance line 26 can be increased and decreased in accordance with an increase and a decrease of the parasitic capacitance between the gate electrode 28 and the drain electrode 32, effects of the parasitic capacitance and the auxiliary capacitance on the feedthrough voltage cancel each other. As a result, it becomes possible to suppress variations of the feedthrough voltage generated by the parasitic capacitance between the gate electrode 28 and the drain electrode 32.

In the above embodiments, the drain electrodes 32 and the corresponding auxiliary capacitance electrodes 33 are integrally formed. However, the invention is not limited to this, and the drain electrodes and the auxiliary capacitance electrodes may be separately formed. In cases where the drain electrodes and the auxiliary capacitance electrodes are separately formed in this way, an active matrix substrate is configured, for example, such that contact holes which pass through a laminated insulating film are formed on drain electrodes and auxiliary capacitance electrodes, and the drain electrodes and the auxiliary capacitance electrodes are connected through the contact holes to pixel electrodes, so that the drain electrodes and the auxiliary capacitance electrodes are electrically connected.

In the above second embodiment, the alignment regulating portions 36a of the active matrix substrate 20 are made of slits of openings which are formed in the corresponding pixel electrodes 36, and the alignment regulating portions 46 of the counter substrate 40 are made of projections. However, the invention is not limited to this, and the alignment regulating portions of the active matrix substrate 20 may be made of projections which are formed to project on the side of the liquid crystal layer 14, and alignment regulating portions of the counter substrate 40 may be made of slits of openings which are formed in the common electrode 44. The slits of the active matrix substrate 20 may be made of cutouts. Even with such a configuration, it becomes possible to obtain effects similar to those in the above second embodiment.

In the above second embodiment, the capacitance branch lines 26b are formed to overlap the projections 46. However, the invention is not limited to this. The capacitance branch lines 26b may be formed to overlap the slits 36a, and part of the slits 36a may be formed to overlap the capacitance branch lines 26b. It is preferable that at least part of a plurality of alignment regulating portions 36a and 46 be formed to overlap at least part of the auxiliary capacitance lines 26 and the auxiliary capacitance electrodes 33.

With such a configuration, part of a plurality of alignment regulating portions 36a and 46 near which alignment of liquid crystal molecules is likely to be out of order is formed to overlap at least part of the auxiliary capacitance line 26 and the auxiliary capacitance electrode 33 which block light transmission. It is therefore possible to suppress the decrease in light transmittance, and suppress light leakage from the areas where liquid crystal molecules are likely to be out of alignment, which enables contrast to be increased, compared to cases where part of the plurality of alignment regulating portions 36a and 46 is formed in another area, that is, the plurality of alignment regulating portions 36a and 46 are formed so as not to overlap either the auxiliary capacitance line 26 or the auxiliary capacitance electrode 33.

In the above fourth embodiment, FIG. 15 shows one linearly formed auxiliary capacitance line 26. However, the invention is not limited to this. In the active matrix substrate 20 where the source electrodes 31 in each pixel region group 23 are connected to the same source lines 24, and the gate electrodes 28 are connected to the gate lines 25 which differ from one another, each auxiliary capacitance line 26 may have a capacitance main line provided to extend along the gate line 25 and a capacitance branch line provided to project to a side from the capacitance main line, as in the above second embodiment, and further the auxiliary capacitance electrode 33 may be provided to overlap the capacitance main line and the capacitance branch line.

In the above embodiments, descriptions have been given, taking as an example the liquid crystal display device S to which the active matrix substrate 20 is applied. However, the invention is not limited to this, and is applicable to other display devices, such as organic electroluminescent display devices.

INDUSTRIAL APPLICABILITY

As described above, the invention is useful for an active matrix substrate and a liquid crystal display device, and more particularly is suitable for an active matrix substrate and a liquid crystal display device in which there is a need for suppressing variations of a feedthrough voltage generated by a parasitic capacitance between a gate electrode and a drain electrode.

DESCRIPTION OF REFERENCE CHARACTERS

S Liquid Crystal Display Device
11 Pixel
11r Red Pixel
11g Green Pixel
11b Blue Pixel
12 Pixel Group
14 Liquid Crystal Layer
15 Sealing Material
17 Source Driver IC Chip
18 Gate Driver IC Chip
20 Active Matrix Substrate
22 Pixel Region
23 Pixel Region Group
24 Source Line
25 Gate Line
26 Auxiliary Capacitance Line
26a Capacitance Main Line
26b Capacitance Branch Line
27 TFT (Thin Film Transistor)
28 Gate Electrode
30 Semiconductor Layer
31 Source Electrode
32 Drain Electrode
33 Auxiliary Capacitance Electrode
36 Pixel Electrode
36a Slit (Alignment Regulating Portion)
37 Alignment Layer (Vertical Alignment Layer)
40 Counter Substrate
44 Common Electrode
44a Slit (Alignment Regulating Portion)
45 Alignment Layer (Vertical Alignment Layer)
46 Projection (Alignment Regulating Portion)

The invention claimed is:

1. An active matrix substrate, comprising:
a plurality of pixel regions defined in a matrix form;
a plurality of source lines provided to extend in parallel to one another between the pixel regions;
a plurality of gate lines provided to extend in parallel to one another in directions intersecting the source lines;
a plurality of auxiliary capacitance lines provided to each extend between the gate lines;
a plurality of thin film transistors each having a gate electrode electrically connected to one of the gate lines, a semiconductor layer provided to overlap the gate electrode, a source electrode provided to overlap the gate electrode and the semiconductor layer, the source electrode being electrically connected to one of the source lines, and a drain electrode provided to cross an end of the gate electrode so as to overlap the gate electrode and the semiconductor layer; and
a plurality of auxiliary capacitance electrodes provided in the corresponding pixel regions to extend along the auxiliary capacitance lines and to overlap the auxiliary capacitance lines, in a same layer as the drain electrode of each of the thin film transistors, wherein
in each of the auxiliary capacitance electrodes of the pixel regions, a side end on one side is disposed inside of one of the auxiliary capacitance lines, the side end on one side being in a direction in which the drain electrode crosses the end of the gate electrode so as to enter from outside of the gate electrode to inside thereof, and a side end on another side is disposed outside of the one of the auxiliary capacitance lines, the side end on another side being in a direction in which the drain electrode crosses the end of the gate electrode so as to go out from the inside of the gate electrode to the outside thereof.

2. The active matrix substrate of claim 1, wherein
each of the auxiliary capacitance lines has a capacitance main line provided to extend along one of the gate lines, and a capacitance branch line provided to project to a side from the capacitance main line, and
each of the auxiliary capacitance electrodes is provided to overlap the capacitance main line and the capacitance branch line.

3. The active matrix substrate of claim 1, wherein
the plurality of pixel regions are included in a plurality of pixel region groups arranged along the source lines, and in each of the pixel region groups, the source electrodes are connected to the same one of the source lines, and the gate electrodes are connected to the gate lines which differ from one another.

4. A liquid crystal display device, comprising:

the active matrix substrate of claim 1;

a counter substrate disposed to face the active matrix substrate; and a liquid crystal layer provided between the active matrix substrate and the counter substrate.

5. The liquid crystal display device of claim 4, wherein a vertical alignment layer and a plurality of alignment regulating portions for dividing the liquid crystal layer into a plurality of domains for each of the pixel regions are provided on each of sides of the liquid crystal layer of the active matrix substrate and the counter substrate, and at least part of the plurality of alignment regulating portions is formed to overlap at least one of the auxiliary capacitance lines and the auxiliary capacitance electrodes.

6. The liquid crystal display device of claim 5, wherein each of the auxiliary capacitance lines has a capacitance main line provided to extend along one of the gate lines, and a capacitance branch line provided to project to a side from the capacitance main line, and each of the auxiliary capacitance electrodes is provided to overlap the capacitance main line and the capacitance branch line.

7. The liquid crystal display device of claim 6, wherein each of the auxiliary capacitance electrodes is provided to extend along the capacitance main line and the capacitance branch line such that, in a plurality of portions among portions along the capacitance main line and the capacitance branch line, the side end on one side is disposed inside of the auxiliary capacitance line, and the side end on another side is disposed outside of the auxiliary capacitance line.

8. The liquid crystal display device of claim 5, wherein a pixel electrode electrically connected to the drain electrode is provided in each of the pixel regions, each of the alignment regulating portions of the active matrix substrate is made of a slit formed in the pixel electrode, and each of the alignment regulating portions of the counter substrate is made of a projection formed to project on the side of the liquid crystal layer.

9. The liquid crystal display device of claim 5, wherein a pixel electrode electrically connected to the drain electrode is provided in each of the pixel regions, on the side of the liquid crystal layer of the counter substrate, a common electrode is provided to overlap the pixel electrode, each of the alignment regulating portions of the active matrix substrate is made of a slit formed in the pixel electrode, and each of the alignment regulating portions of the counter substrate is made of a slit formed in the common electrode.

* * * * *